(12) United States Patent
Anthony et al.

(10) Patent No.: US 7,180,718 B2
(45) Date of Patent: Feb. 20, 2007

(54) SHIELDED ENERGY CONDITIONER

(75) Inventors: David Anthony, Erie, PA (US); Anthony Anthony, Erie, PA (US); William Anthony, Erie, PA (US)

(73) Assignee: X2Y Attenuators, LLC, Erie, PA (US)

( * ) Notice: Subject to any disclaimer, the term of this patent is extended or adjusted under 35 U.S.C. 154(b) by 496 days.

(21) Appl. No.: 10/766,000

(22) Filed: Jan. 29, 2004

(65) Prior Publication Data
US 2004/0226733 A1    Nov. 18, 2004

Related U.S. Application Data

(60) Provisional application No. 60/472,113, filed on May 21, 2003, provisional application No. 60/445,802, filed on Feb. 10, 2003, provisional application No. 60/443,855, filed on Jan. 31, 2003.

(51) Int. Cl.
*H02H 9/00*    (2006.01)
(52) U.S. Cl. .................................... 361/118
(58) Field of Classification Search ............... 361/118
See application file for complete search history.

(56) References Cited

U.S. PATENT DOCUMENTS

| | | |
|---|---|---|
| 3,240,621 A | 3/1966 | Flower, Jr. et al. |
| 3,343,034 A | 9/1967 | Ovshinsky |
| 3,573,677 A | 4/1971 | Detar |
| 3,742,420 A | 6/1973 | Harnden, Jr. |
| 3,790,858 A | 2/1974 | Brancaleone et al. |
| 3,842,374 A | 10/1974 | Schlicke |
| 4,023,071 A | 5/1977 | Fussell |
| 4,119,084 A | 10/1978 | Eckels |
| 4,135,132 A | 1/1979 | Tafjord |
| 4,139,783 A | 2/1979 | Engeler |
| 4,191,986 A | 3/1980 | ta Huang et al. |
| 4,198,613 A | 4/1980 | Whitley |
| 4,259,604 A | 3/1981 | Aoki |
| 4,262,317 A | 4/1981 | Baumbach |
| 4,275,945 A | 6/1981 | Krantz et al. |
| 4,292,558 A | 9/1981 | Flick et al. |
| 4,308,509 A | 12/1981 | Tsuchiya et al. |
| 4,320,364 A | 3/1982 | Sakamoto et al. |
| 4,335,417 A | 6/1982 | Sakshaug et al. |
| 4,353,044 A | 10/1982 | Nossek |
| 4,366,456 A | 12/1982 | Ueno et al. |

(Continued)

FOREIGN PATENT DOCUMENTS

DE    197 28 692 A1    1/1999

(Continued)

OTHER PUBLICATIONS

Oct. 1, 2002, PCT International Search Report for PCT/US01/48861.

(Continued)

*Primary Examiner*—Stephen W. Jackson
(74) *Attorney, Agent, or Firm*—Neifeld IP Law, PC

(57) ABSTRACT

A structure comprising: a first electrode; a second electrode; a shielding electrode provides improved energy conditioning when used in electrical circuits. The structures may exist as discrete components, as part of an interposer or a first level interconnects, or a part of an integrated circuit.

66 Claims, 10 Drawing Sheets

U.S. PATENT DOCUMENTS

| | | |
|---|---|---|
| 4,384,263 A | 5/1983 | Neuman et al. |
| 4,394,639 A | 7/1983 | McGalliard |
| 4,412,146 A | 10/1983 | Futterer et al. |
| 4,494,092 A | 1/1985 | Griffin et al. |
| 4,533,931 A | 8/1985 | Mandai et al. |
| 4,553,114 A | 11/1985 | English et al. |
| 4,563,659 A | 1/1986 | Sakamoto |
| 4,586,104 A | 4/1986 | Standler |
| 4,587,589 A | 5/1986 | Marek |
| 4,590,537 A | 5/1986 | Sakamoto |
| 4,612,140 A | 9/1986 | Mandai et al. |
| 4,612,497 A | 9/1986 | Ulmer |
| 4,636,752 A | 1/1987 | Saito |
| 4,682,129 A | 7/1987 | Bakermans et al. |
| 4,685,025 A | 8/1987 | Carlomagno |
| 4,688,151 A | 8/1987 | Kraus et al. |
| 4,694,265 A | 9/1987 | Kupper |
| 4,698,721 A | 10/1987 | Warren |
| 4,703,386 A | 10/1987 | Speet et al. |
| 4,712,540 A | 12/1987 | Tucker et al. |
| 4,713,540 A | 12/1987 | Gilby et al. |
| 4,720,760 A | 1/1988 | Starr |
| 4,746,557 A | 5/1988 | Sakamoto et al. |
| 4,752,752 A | 6/1988 | Okubo |
| 4,760,485 A | 7/1988 | Ari et al. |
| 4,772,225 A | 9/1988 | Ulery |
| 4,777,460 A | 10/1988 | Okubo |
| 4,780,598 A | 10/1988 | Fahey et al. |
| 4,782,311 A | 11/1988 | Ookubo |
| 4,789,847 A | 12/1988 | Sakamoto et al. |
| 4,794,485 A | 12/1988 | Bennett |
| 4,794,499 A | 12/1988 | Ott |
| 4,795,658 A | 1/1989 | Kano et al. |
| 4,799,070 A | 1/1989 | Nishikawa |
| 4,801,904 A | 1/1989 | Sakamoto et al. |
| 4,814,295 A | 3/1989 | Mehta |
| 4,814,938 A | 3/1989 | Arakawa et al. |
| 4,814,941 A | 3/1989 | Speet et al. |
| 4,819,126 A | 4/1989 | Kornrumpf et al. |
| 4,845,606 A | 7/1989 | Herbert |
| 4,847,730 A | 7/1989 | Konno et al. |
| 4,904,967 A | 2/1990 | Morii et al. |
| 4,908,586 A | 3/1990 | Kling et al. |
| 4,908,590 A | 3/1990 | Sakamoto et al. |
| 4,924,340 A | 5/1990 | Sweet |
| 4,942,353 A | 7/1990 | Herbert et al. |
| 4,967,315 A | 10/1990 | Schelhorn |
| 4,978,906 A | 12/1990 | Herbert et al. |
| 4,990,202 A | 2/1991 | Murata et al. |
| 4,999,595 A | 3/1991 | Azumi et al. |
| 5,029,062 A | 7/1991 | Capel |
| 5,034,709 A | 7/1991 | Azumi et al. |
| 5,034,710 A | 7/1991 | Kawaguchi |
| 5,051,712 A | 9/1991 | Naito et al. |
| 5,059,140 A | 10/1991 | Philippson et al. |
| 5,065,284 A | 11/1991 | Hernandez |
| 5,073,523 A | 12/1991 | Yamada et al. |
| 5,079,069 A | 1/1992 | Howard et al. |
| 5,079,223 A | 1/1992 | Maroni |
| 5,079,669 A | 1/1992 | Williams |
| 5,089,688 A | 2/1992 | Fang et al. |
| 5,105,333 A | 4/1992 | Yamano et al. |
| 5,107,394 A | 4/1992 | Naito et al. |
| 5,109,206 A | 4/1992 | Carlile |
| 5,140,297 A | 8/1992 | Jacobs et al. |
| 5,140,497 A | 8/1992 | Kato et al. |
| 5,142,430 A | 8/1992 | Anthony |
| 5,148,005 A | 9/1992 | Fang et al. |
| 5,155,655 A | 10/1992 | Howard et al. |
| 5,161,086 A | 11/1992 | Howard et al. |
| 5,167,483 A | 12/1992 | Gardiner |
| 5,173,670 A | 12/1992 | Naito et al. |
| 5,179,362 A | 1/1993 | Okochi et al. |
| 5,181,859 A | 1/1993 | Foreman et al. |
| 5,186,647 A | 2/1993 | Denkmann et al. |
| 5,208,502 A | 5/1993 | Yamashita et al. |
| 5,219,812 A | 6/1993 | Doi et al. |
| 5,220,480 A | 6/1993 | Kershaw, Jr. et al. |
| 5,236,376 A | 8/1993 | Cohen |
| 5,243,308 A | 9/1993 | Shusterman et al. |
| 5,251,092 A | 10/1993 | Brady et al. |
| 5,257,950 A | 11/1993 | Lenker et al. |
| 5,261,153 A | 11/1993 | Lucas |
| 5,262,611 A | 11/1993 | Danysh et al. |
| 5,268,810 A | 12/1993 | DiMarco et al. |
| 5,290,191 A | 3/1994 | Foreman et al. |
| 5,299,956 A | 4/1994 | Brownell et al. |
| 5,300,760 A | 4/1994 | Batliwalla et al. |
| 5,310,363 A | 5/1994 | Brownell et al. |
| 5,311,408 A | 5/1994 | Ferchau et al. |
| 5,321,373 A | 6/1994 | Shusterman et al. |
| 5,321,573 A | 6/1994 | Person et al. |
| 5,326,284 A | 7/1994 | Bohbot et al. |
| 5,337,028 A | 8/1994 | White |
| 5,353,189 A | 10/1994 | Tomlinson |
| 5,353,202 A | 10/1994 | Ansell et al. |
| 5,357,568 A | 10/1994 | Pelegris |
| 5,362,249 A | 11/1994 | Carter |
| 5,362,254 A | 11/1994 | Siemon et al. |
| 5,378,407 A | 1/1995 | Chandler et al. |
| 5,382,928 A | 1/1995 | Davis et al. |
| 5,382,938 A | 1/1995 | Hansson et al. |
| 5,396,201 A | 3/1995 | Ishizaki et al. |
| 5,401,952 A | 3/1995 | Sugawa |
| 5,405,466 A | 4/1995 | Naito et al. |
| 5,414,393 A | 5/1995 | Rose et al. |
| 5,414,587 A | 5/1995 | Kiser et al. |
| 5,420,553 A | 5/1995 | Sakamoto et al. |
| 5,432,484 A | 7/1995 | Klas et al. |
| 5,446,625 A | 8/1995 | Urbish et al. |
| 5,450,278 A | 9/1995 | Lee et al. |
| 5,451,919 A | 9/1995 | Chu et al. |
| RE35,064 E | 10/1995 | Hernandez |
| 5,455,734 A | 10/1995 | Foreman et al. |
| 5,461,351 A | 10/1995 | Shusterman |
| 5,463,232 A | 10/1995 | Yamashita et al. |
| 5,471,035 A | 11/1995 | Holmes |
| 5,477,933 A | 12/1995 | Nguyen |
| 5,481,238 A | 1/1996 | Carsten et al. |
| 5,483,407 A | 1/1996 | Anastasio et al. |
| 5,488,540 A | 1/1996 | Hatta |
| 5,491,299 A | 2/1996 | Naylor et al. |
| 5,493,260 A | 2/1996 | Park |
| 5,495,180 A | 2/1996 | Huang et al. |
| 5,500,629 A | 3/1996 | Meyer |
| 5,500,785 A | 3/1996 | Funada |
| 5,512,196 A | 4/1996 | Mantese et al. |
| 5,531,003 A | 7/1996 | Seifried et al. |
| 5,534,837 A | 7/1996 | Brandt |
| 5,535,101 A | 7/1996 | Miles et al. |
| 5,536,978 A | 7/1996 | Cooper et al. |
| 5,541,482 A | 7/1996 | Siao |
| 5,544,002 A | 8/1996 | Iwaya et al. |
| 5,546,058 A | 8/1996 | Azuma et al. |
| 5,548,255 A | 8/1996 | Spielman |
| 5,555,150 A | 9/1996 | Newman, Jr. |
| 5,568,348 A | 10/1996 | Foreman et al. |
| 5,570,278 A | 10/1996 | Cross |
| 5,583,359 A | 12/1996 | Ng et al. |
| 5,586,007 A | 12/1996 | Funada |
| 5,592,391 A | 1/1997 | Muyshondt et al. |
| 5,612,657 A | 3/1997 | Kledzik |
| 5,614,881 A | 3/1997 | Duggal et al. |
| 5,619,079 A | 4/1997 | Wiggins et al. |

| | | | | | | |
|---|---|---|---|---|---|---|
| 5,624,592 A | 4/1997 | Paustian | | 6,078,229 A | 6/2000 | Funada et al. |
| 5,640,048 A | 6/1997 | Selna | | 6,088,235 A | 7/2000 | Chiao et al. |
| 5,645,746 A | 7/1997 | Walsh | | 6,091,310 A | 7/2000 | Utsumi et al. |
| 5,647,766 A | 7/1997 | Nguyen | | 6,092,269 A | 7/2000 | Yializis et al. |
| 5,668,511 A | 9/1997 | Furutani et al. | | 6,094,112 A | 7/2000 | Goldberger et al. |
| 5,682,303 A | 10/1997 | Goad | | 6,094,339 A | 7/2000 | Evans |
| 5,700,167 A | 12/1997 | Pharney et al. | | 6,097,260 A | 8/2000 | Whybrew et al. |
| 5,708,553 A | 1/1998 | Hung | | 6,097,581 A | 8/2000 | Anthony |
| 5,719,450 A | 2/1998 | Vora | | 6,104,258 A | 8/2000 | Novak |
| 5,719,477 A | 2/1998 | Tomihari | | 6,104,599 A | 8/2000 | Ahiko et al. |
| 5,719,750 A | 2/1998 | Iwane | | 6,108,448 A | 8/2000 | Song et al. |
| 5,751,539 A | 5/1998 | Stevenson et al. | | 6,111,479 A | 8/2000 | Myohga et al. |
| 5,767,446 A | 6/1998 | Ha et al. | | 6,120,326 A | 9/2000 | Brooks |
| 5,789,999 A | 8/1998 | Barnett et al. | | 6,121,761 A | 9/2000 | Herbert |
| 5,790,368 A | 8/1998 | Naito et al. | | 6,125,044 A | 9/2000 | Cherniski et al. |
| 5,796,568 A | 8/1998 | Baiatu | | 6,130,585 A | 10/2000 | Whybrew et al. |
| 5,796,595 A | 8/1998 | Cross | | 6,137,392 A | 10/2000 | Herbert |
| 5,797,770 A | 8/1998 | Davis et al. | | 6,142,831 A | 11/2000 | Ashman et al. |
| 5,808,873 A | 9/1998 | Celaya et al. | | 6,144,547 A | 11/2000 | Retseptor |
| 5,825,628 A | 10/1998 | Garbelli et al. | | 6,147,587 A | 11/2000 | Hadano et al. |
| 5,828,093 A | 10/1998 | Naito et al. | | 6,150,895 A | 11/2000 | Steigerwald et al. |
| 5,828,272 A | 10/1998 | Romerein et al. | | 6,157,528 A | 12/2000 | Anthony |
| 5,828,555 A | 10/1998 | Itoh | | 6,157,547 A | 12/2000 | Brown et al. |
| 5,831,489 A | 11/1998 | Wire | | 6,163,454 A | 12/2000 | Strickler |
| 5,834,992 A | 11/1998 | Kato et al. | | 6,163,456 A | 12/2000 | Suzuki et al. |
| 5,838,216 A | 11/1998 | White et al. | | 6,165,814 A | 12/2000 | Wark et al. |
| 5,867,361 A | 2/1999 | Wolf et al. | | 6,175,287 B1 | 1/2001 | Lampen et al. |
| 5,870,272 A | 2/1999 | Seifried et al. | | 6,180,588 B1 | 1/2001 | Walters |
| 5,875,099 A | 2/1999 | Maesaka et al. | | 6,181,231 B1 | 1/2001 | Bartilson |
| 5,880,925 A | 3/1999 | DuPre et al. | | 6,183,685 B1 | 2/2001 | Cowman et al. |
| 5,889,445 A | 3/1999 | Ritter et al. | | 6,185,091 B1 | 2/2001 | Tanahashi et al. |
| 5,895,990 A | 4/1999 | Lau | | 6,188,565 B1 | 2/2001 | Naito et al. |
| 5,898,403 A | 4/1999 | Saitoh et al. | | 6,191,475 B1 | 2/2001 | Skinner et al. |
| 5,898,562 A | 4/1999 | Cain et al. | | 6,191,669 B1 | 2/2001 | Shigemura |
| 5,905,627 A | 5/1999 | Brendel et al. | | 6,191,932 B1 | 2/2001 | Kuroda et al. |
| 5,907,265 A | 5/1999 | Sakuragawa et al. | | 6,195,269 B1 | 2/2001 | Hino |
| 5,908,151 A | 6/1999 | Elias | | 6,198,123 B1 | 3/2001 | Linder et al. |
| 5,909,155 A | 6/1999 | Anderson et al. | | 6,198,362 B1 | 3/2001 | Harada et al. |
| 5,909,350 A | 6/1999 | Anthony | | 6,204,448 B1 | 3/2001 | Garland et al. |
| 5,910,755 A | 6/1999 | Mishiro et al. | | 6,205,014 B1 | 3/2001 | Inomata et al. |
| 5,912,809 A | 6/1999 | Steigerwald et al. | | 6,207,081 B1 | 3/2001 | Sasaki et al. |
| 5,917,388 A | 6/1999 | Tronche et al. | | 6,208,063 B1 | 3/2001 | Horikawa |
| 5,926,377 A | 7/1999 | Nakao et al. | | 6,208,225 B1 | 3/2001 | Miller |
| 5,928,076 A | 7/1999 | Clements et al. | | 6,208,226 B1 | 3/2001 | Chen et al. |
| 5,955,930 A | 9/1999 | Anderson et al. | | 6,208,494 B1 | 3/2001 | Nakura et al. |
| 5,959,829 A | 9/1999 | Stevenson et al. | | 6,208,495 B1 | 3/2001 | Wieloch et al. |
| 5,959,846 A | 9/1999 | Noguchi et al. | | 6,208,501 B1 | 3/2001 | Ingalls et al. |
| 5,969,461 A | 10/1999 | Anderson et al. | | 6,208,502 B1 | 3/2001 | Hudis et al. |
| 5,977,845 A | 11/1999 | Kitahara | | 6,208,503 B1 | 3/2001 | Shimada et al. |
| 5,978,231 A | 11/1999 | Tohya et al. | | 6,208,521 B1 | 3/2001 | Nakatsuka |
| 5,980,718 A | 11/1999 | Van Konynenburg et al. | | 6,208,525 B1 | 3/2001 | Imasu et al. |
| 5,995,352 A | 11/1999 | Gumley | | 6,211,754 B1 | 4/2001 | Nishida et al. |
| 5,999,067 A | 12/1999 | D'Ostilio | | 6,212,078 B1 | 4/2001 | Hunt et al. |
| 5,999,398 A | 12/1999 | Makl et al. | | 6,215,647 B1 | 4/2001 | Naito et al. |
| 6,004,752 A | 12/1999 | Loewy et al. | | 6,215,649 B1 | 4/2001 | Appelt et al. |
| 6,013,957 A | 1/2000 | Puzo et al. | | 6,218,631 B1 | 4/2001 | Hetzel et al. |
| 6,016,095 A | 1/2000 | Herbert | | 6,219,240 B1 | 4/2001 | Sasov |
| 6,018,448 A | 1/2000 | Anthony | | 6,222,427 B1 | 4/2001 | Kato et al. |
| 6,021,564 A | 2/2000 | Hanson | | 6,222,431 B1 | 4/2001 | Ishizaki et al. |
| 6,023,406 A | 2/2000 | Kinoshita et al. | | 6,225,876 B1 | 5/2001 | Akino et al. |
| 6,031,710 A | 2/2000 | Wolf et al. | | 6,226,169 B1 | 5/2001 | Naito et al. |
| 6,034,576 A | 3/2000 | Kuth | | 6,226,182 B1 | 5/2001 | Maehara |
| 6,034,864 A | 3/2000 | Naito et al. | | 6,229,226 B1 | 5/2001 | Kramer et al. |
| 6,037,846 A | 3/2000 | Oberhammer | | 6,236,572 B1 | 5/2001 | Teshome et al. |
| 6,038,121 A | 3/2000 | Naito et al. | | 6,240,621 B1 | 6/2001 | Nellissen et al. |
| 6,042,685 A | 3/2000 | Shinada et al. | | 6,243,253 B1 | 6/2001 | DuPre et al. |
| 6,046,898 A | 4/2000 | Seymour et al. | | 6,249,047 B1 | 6/2001 | Corisis |
| 6,052,038 A | 4/2000 | Savicki | | 6,249,439 B1 | 6/2001 | DeMore et al. |
| 6,061,227 A | 5/2000 | Nogi | | 6,252,161 B1 | 6/2001 | Hailey et al. |
| 6,064,286 A | 5/2000 | Ziegner et al. | | 6,262,895 B1 | 7/2001 | Forthun |
| 6,072,687 A | 6/2000 | Naito et al. | | 6,266,228 B1 | 7/2001 | Naito et al. |
| 6,075,211 A | 6/2000 | Tohya et al. | | 6,266,229 B1 | 7/2001 | Naito et al. |
| 6,078,117 A | 6/2000 | Perrin et al. | | 6,272,003 B1 | 8/2001 | Schaper |

| | | |
|---|---|---|
| 6,282,074 B1 | 8/2001 | Anthony |
| 6,282,079 B1 | 8/2001 | Nagakari et al. |
| 6,285,109 B1 | 9/2001 | Katagiri et al. |
| 6,285,542 B1 | 9/2001 | Kennedy, III et al. |
| 6,292,350 B1 | 9/2001 | Naito et al. |
| 6,292,351 B1 | 9/2001 | Ahiko et al. |
| 6,309,245 B1 | 10/2001 | Sweeney |
| 6,310,286 B1 | 10/2001 | Troxel et al. |
| 6,313,584 B1 | 11/2001 | Johnson et al. |
| 6,320,547 B1 | 11/2001 | Fathy et al. |
| 6,324,047 B1 | 11/2001 | Hayworth |
| 6,324,048 B1 | 11/2001 | Liu |
| 6,325,672 B1 | 12/2001 | Belopolsky et al. |
| 6,327,134 B1 | 12/2001 | Kuroda et al. |
| 6,327,137 B1 | 12/2001 | Yamamoto et al. |
| 6,331,926 B1 | 12/2001 | Anthony |
| 6,331,930 B1 | 12/2001 | Kuroda |
| 6,342,681 B1 | 1/2002 | Goldberger et al. |
| 6,373,673 B1 | 4/2002 | Anthony |
| 6,388,856 B1 | 5/2002 | Anthony |
| 6,395,996 B1 | 5/2002 | Tsai et al. |
| 6,448,873 B1 | 9/2002 | Mostov |
| 6,456,481 B1 | 9/2002 | Stevenson |
| 6,469,595 B2 | 10/2002 | Anthony et al. |
| 6,498,710 B1 | 12/2002 | Anthony |
| 6,504,451 B1 | 1/2003 | Yamaguchi |
| 6,509,807 B1 | 1/2003 | Anthony et al. |
| 6,510,038 B1 | 1/2003 | Satou et al. |
| 6,522,516 B2 | 2/2003 | Anthony |
| 6,549,389 B2 | 4/2003 | Anthony et al. |
| 6,563,688 B2 | 5/2003 | Anthony et al. |
| 6,580,595 B2 * | 6/2003 | Anthony et al. ............ 361/111 |
| 6,594,128 B2 | 7/2003 | Anthony |
| 6,603,372 B1 | 8/2003 | Ishizaki et al. |
| 6,603,646 B2 | 8/2003 | Anthony et al. |
| 6,606,011 B2 | 8/2003 | Anthony et al. |
| 6,606,237 B1 | 8/2003 | Naito et al. |
| 6,618,268 B2 | 9/2003 | Dibene, II et al. |
| 6,636,406 B1 | 10/2003 | Anthony |
| 6,650,525 B2 | 11/2003 | Anthony |
| 6,687,108 B1 | 2/2004 | Anthony et al. |
| 6,696,952 B2 | 2/2004 | Zirbes |
| 6,717,301 B2 | 4/2004 | De Daran et al. |
| 6,738,249 B1 | 5/2004 | Anthony et al. |
| 6,806,806 B2 | 10/2004 | Anthony |
| 6,873,513 B2 | 3/2005 | Anthony |
| 6,894,884 B2 | 5/2005 | Anthony, Jr. et al. |
| 6,950,293 B2 | 9/2005 | Anthony |
| 6,954,346 B2 | 10/2005 | Anthony |
| 6,995,983 B1 | 2/2006 | Anthony et al. |
| 2001/0001989 A1 | 5/2001 | Smith |
| 2001/0002105 A1 | 5/2001 | Brandelik et al. |
| 2001/0002624 A1 | 6/2001 | Khandros et al. |
| 2001/0008288 A1 | 7/2001 | Kimura et al. |
| 2001/0008302 A1 | 7/2001 | Murakami et al. |
| 2001/0008478 A1 | 7/2001 | McIntosh et al. |
| 2001/0008509 A1 | 7/2001 | Watanabe |
| 2001/0009496 A1 | 7/2001 | Kappel et al. |
| 2001/0010444 A1 | 8/2001 | Pahl et al. |
| 2001/0011763 A1 | 8/2001 | Ushijima et al. |
| 2001/0011934 A1 | 8/2001 | Yamamoto |
| 2001/0011937 A1 | 8/2001 | Satoh et al. |
| 2001/0013626 A1 | 8/2001 | Fujii |
| 2001/0015643 A1 | 8/2001 | Goldfine et al. |
| 2001/0015683 A1 | 8/2001 | Mikami et al. |
| 2001/0017576 A1 | 8/2001 | Kondo et al. |
| 2001/0017579 A1 | 8/2001 | Kurata |
| 2001/0019869 A1 | 9/2001 | Hsu |
| 2001/0020879 A1 | 9/2001 | Takahashi et al. |
| 2001/0021097 A1 | 9/2001 | Ohya et al. |
| 2001/0022547 A1 | 9/2001 | Murata et al. |
| 2001/0023983 A1 | 9/2001 | Kobayashi et al. |
| 2001/0024148 A1 | 9/2001 | Gerstenberg et al. |
| 2001/0028581 A1 | 10/2001 | Yanagisawa et al. |
| 2001/0029648 A1 | 10/2001 | Ikada et al. |
| 2001/0031191 A1 | 10/2001 | Korenaga |
| 2001/0033664 A1 | 10/2001 | Poux et al. |
| 2001/0035801 A1 | 11/2001 | Gilbert |
| 2001/0035802 A1 | 11/2001 | Kadota |
| 2001/0035805 A1 | 11/2001 | Suzuki et al. |
| 2001/0037680 A1 | 11/2001 | Buck et al. |
| 2001/0039834 A1 | 11/2001 | Hsu |
| 2001/0040484 A1 | 11/2001 | Kim |
| 2001/0040487 A1 | 11/2001 | Ikata et al. |
| 2001/0040488 A1 | 11/2001 | Gould et al. |
| 2001/0041305 A1 | 11/2001 | Sawada et al. |
| 2001/0043100 A1 | 11/2001 | Tomita et al. |
| 2001/0043129 A1 | 11/2001 | Hidaka et al. |
| 2001/0043450 A1 | 11/2001 | Seale et al. |
| 2001/0043453 A1 | 11/2001 | Narwankar et al. |
| 2001/0045810 A1 | 11/2001 | Poon et al. |
| 2001/0048581 A1 | 12/2001 | Anthony et al. |
| 2001/0048593 A1 | 12/2001 | Yamauchi et al. |
| 2001/0048906 A1 | 12/2001 | Lau et al. |
| 2001/0050550 A1 | 12/2001 | Yoshida et al. |
| 2001/0050600 A1 | 12/2001 | Anthony et al. |
| 2001/0050837 A1 | 12/2001 | Stevenson et al. |
| 2001/0052833 A1 | 12/2001 | Enokihara et al. |
| 2001/0054512 A1 | 12/2001 | Belau et al. |
| 2001/0054734 A1 | 12/2001 | Koh et al. |
| 2001/0054756 A1 | 12/2001 | Horiuchi et al. |
| 2001/0054936 A1 | 12/2001 | Okada et al. |
| 2002/0000521 A1 | 1/2002 | Brown |
| 2002/0000583 A1 | 1/2002 | Kitsukawa et al. |
| 2002/0000821 A1 | 1/2002 | Haga et al. |
| 2002/0000893 A1 | 1/2002 | Hidaka et al. |
| 2002/0000895 A1 | 1/2002 | Takahashi et al. |
| 2002/0003454 A1 | 1/2002 | Sweeney et al. |
| 2002/0005880 A1 | 1/2002 | Ashe et al. |
| 2002/0024787 A1 | 2/2002 | Anthony |
| 2002/0027263 A1 | 3/2002 | Anthony et al. |
| 2002/0027760 A1 | 3/2002 | Anthony |
| 2002/0044401 A1 | 4/2002 | Anthony et al. |
| 2002/0075096 A1 | 6/2002 | Anthony |
| 2002/0079116 A1 | 6/2002 | Anthony |
| 2002/0089812 A1 | 7/2002 | Anthony et al. |
| 2002/0113663 A1 | 8/2002 | Anthony et al. |
| 2002/0122286 A1 | 9/2002 | Anthony |
| 2002/0131231 A1 | 9/2002 | Anthony |
| 2002/0149900 A1 | 10/2002 | Anthony |
| 2002/0158515 A1 | 10/2002 | Anthony, Jr. et al. |
| 2002/0186100 A1 | 12/2002 | Anthony et al. |
| 2003/0029632 A1 | 2/2003 | Anthony, Jr. et al. |
| 2003/0029635 A1 | 2/2003 | Anthony, Jr. et al. |
| 2003/0048029 A1 | 3/2003 | DeDaran et al. |
| 2003/0067730 A1 | 4/2003 | Anthony et al. |
| 2003/0161086 A1 | 8/2003 | Anthony |
| 2003/0202312 A1 | 10/2003 | Anthony et al. |
| 2003/0206388 A9 | 11/2003 | Anthony et al. |
| 2003/0210125 A1 | 11/2003 | Anthony |
| 2003/0231451 A1 | 12/2003 | Anthony |
| 2003/0231456 A1 | 12/2003 | Anthony et al. |
| 2004/0004802 A1 | 1/2004 | Anthony et al. |
| 2004/0008466 A1 | 1/2004 | Anthony et al. |
| 2004/0027771 A1 | 2/2004 | Anthony |
| 2004/0032304 A1 | 2/2004 | Anthony et al. |
| 2004/0054426 A1 | 3/2004 | Anthony |
| 2004/0085699 A1 | 5/2004 | Anthony |
| 2004/0105205 A1 | 6/2004 | Anthony et al. |
| 2004/0012949 A1 | 7/2004 | Anthony et al. |
| 2004/0130840 A1 | 7/2004 | Anthony |
| 2004/0218332 A1 | 11/2004 | Anthony et al. |
| 2004/0226733 A1 | 11/2004 | Anthony et al. |
| 2005/0016761 A9 | 1/2005 | Anthony, Jr. et al. |
| 2005/0018374 A1 | 1/2005 | Anthony |
| 2005/0063127 A1 | 3/2005 | Anthony |

| | | |
|---|---|---|
| 2005/0248900 A1 | 11/2005 | Anthony |

FOREIGN PATENT DOCUMENTS

| | | |
|---|---|---|
| DE | 198 57 043 C1 | 3/2000 |
| EP | 98915364 | 11/1994 |
| EP | 0776016 | 5/1997 |
| EP | 0933871 | 8/1999 |
| EP | 1022751 | 7/2000 |
| EP | 1024507 | 8/2000 |
| EP | 1061535 | 12/2000 |
| FR | 2765417 | 12/1998 |
| FR | 2808135 | 10/2001 |
| GB | 2217136 | 4/1988 |
| JP | 63-269509 | 11/1988 |
| JP | 1-27251 | 1/1989 |
| JP | 02-267879 | 11/1990 |
| JP | 03-018112 | 1/1991 |
| JP | 5-283284 | 10/1993 |
| JP | 06-053048 | 2/1994 |
| JP | 06-053049 | 2/1994 |
| JP | 06-053075 | 2/1994 |
| JP | 06-053077 | 2/1994 |
| JP | 06-053078 | 2/1994 |
| JP | 06-084695 | 3/1994 |
| JP | 06-151014 | 5/1994 |
| JP | 06-151244 | 5/1994 |
| JP | 06-151245 | 5/1994 |
| JP | 06-325977 | 11/1994 |
| JP | 07-235406 | 9/1995 |
| JP | 07-235852 | 9/1995 |
| JP | 07-240651 | 9/1995 |
| JP | 08-124795 | 5/1996 |
| JP | 08-163122 | 6/1996 |
| JP | 08-172025 | 7/1996 |
| JP | 09-284077 | 10/1997 |
| JP | 09-284078 | 10/1997 |
| JP | 9-294041 | 11/1997 |
| JP | WO 99/37008 | 7/1999 |
| JP | 11-21456 | 8/1999 |
| JP | 11-214256 | 8/1999 |
| JP | 11-223396 | 8/1999 |
| JP | 11-294908 | 10/1999 |
| JP | 11-305302 | 11/1999 |
| JP | 11-319222 | 11/1999 |
| JP | 11-345273 | 12/1999 |
| WO | WO 91/15046 | 10/1991 |
| WO | WO 98/45921 | 10/1998 |
| WO | WO 99/19982 | 4/1999 |
| WO | WO 99/52210 | 10/1999 |
| WO | WO 00/16446 | 3/2000 |
| WO | WO 00/65740 | 11/2000 |
| WO | WO 00/74197 | 12/2000 |
| WO | WO 00/77907 | 12/2000 |
| WO | WO 01/10010 | 2/2001 |
| WO | WO 01/41232 | 6/2001 |
| WO | WO 01/41233 | 6/2001 |
| WO | WO 01/45119 | 6/2001 |
| WO | WO 01/71908 | 9/2001 |
| WO | WO 01/75916 | 10/2001 |
| WO | WO 01/84581 | 11/2001 |
| WO | WO 01/86774 | 11/2001 |
| WO | WO 02/59401 | 1/2002 |
| WO | WO 02/11160 | 2/2002 |
| WO | WO 02/15360 | 2/2002 |
| WO | WO 02/33798 | 4/2002 |
| WO | WO 02/1227794 | 4/2002 |
| WO | WO 02/45233 | 6/2002 |
| WO | WO 02/65606 | 8/2002 |
| WO | WO 02/080330 | 10/2002 |
| WO | WO 03/005541 | 1/2003 |
| WO | WO 04/70905 | 8/2004 |
| WO | WO 05/02018 | 1/2005 |
| WO | WO 05/15719 | 2/2005 |
| WO | WO 05/65097 | 7/2005 |

OTHER PUBLICATIONS

Jan. 2, 2003, PCT International Search Report for PCT/US01/44681.
Greb, "An Intuitive Approach to EM Fields," EMC Test & Design, Jan. 1991, pp. 30-33.
Dec. 1, 1993, Greb, "An Intuitive Approach to EM Coupling," EMC Test & Design, pp. 20-25.
Jun. 1, 1986, Sakamoto, "Noiseproof Power Supplies: What's Important in EMI Removal Filters?" Jee, pp. 80-85.
Jan. 1, 1999, Montrose, "Analysis on Loop Area Trace Radiated Emissions from Decoupling Capacitor Placement on Printed Circuit Boards," IEEE, pp. 423-428.
Jan. 1, 1999, Miyoshi, "Surface Mounted Distributed Constant Type Noise Filter," IEEE, pp. 157-160.
Jan. 1, 1999, Shigeta et al., "Improved EMI Performance by Use of a Three-Terminal-Capacitor Applied to an IC Power Line," IEEE, pp. 161-164.
Jul. 19, 1999, PCT International Search Report for PCT/US99/07653.
IPER for PCT/US99/07653, Oct. 13, 1999.
U.S. Appl. No. 10/479,506, Claims 1-46 from Preliminary Amendment filed Dec. 10, 2003.
U.S. Appl. No. 10/189,339, Claims 1-41 from Preliminary Amendment filed Oct. 28, 2003.
U.S. Appl. No. 10/443,792, Claims 1-41 from Preliminary Amendment filed Oct. 28, 2003.
Aug. 19, 1998, PCT International Search Report for PCT/US98/06962.
Apr. 19, 1999, PCT International Search Report for PCT/US99/01040.
Sep. 18, 2000, PCT International Search Report for PCT/US00/11409.
Sep. 13, 2000, PCT International Search Report for PCT/US00/14626.
Nov. 8, 2000, PCT International Search Report for PCT/US00/16518.
Dec. 28, 2000, PCT International Search Report for PCT/US00/21178.
Fang et al., "Conductive Polymers Prolong Circuit Life," Design News, date unknown, 3 pages.
Carpenter, Jr. et al., "A New Approach to TVSS Design," Power Quality Assurance, Sep./Oct. 1996 p. 60-63.
Jan. 1, 1996, Raychem, "Polyswitch Resettable Fuses," Circuit Protection Databook, pp. 11-18.
Dec. 28, 2001, PCT International Search Report for PCT/US01/41720.
Jun. 13, 2001, PCT International Search Report for PCT/US01/09185.
Jul. 1, 2000, Polka et al., "Package-Level Interconnect Design for Optimum Electrical Performance," Intel Technology Journal Q3, pp. 1-17.
May 10, 2002, PCT International Search Report for PCT/US01/43418.
Mar. 13, 2002, PCT International Search Report for PCT/US01/32480.
Aug. 19, 2002, PCT International Search Report for PCT/US02/10302.
Feb. 28, 2003, PCT International Search Report for PCT/US02/21238.
Mar. 18, 2002, PCT International Search Report for PCT/US01/13911.
Jul. 16, 1991, PCT International Search Report for PCT/US91/02150.
Jun. 28, 2001, PCT International Search Report for PCT/US01/03792.
"Johanson Dielectrics, Inc. Licenses X2Y Circuit Conditioning Technology," Press Release, Dec. 16, 1998, 1 page.
Mar. 1, 1997, Beyne et al., "PSGA—an innovative IC package for single and multichip designs," Components, pp. 6-9.

"EMC Design for Brush Commutated DC Electric Motors," Sep. 15, 1997, pp. 1-2.

Apr. 1, 1996, "Tomorrow's Capacitors," Components, No. 4, p. 3.

Mason, "Valor—Understanding Common Mode Noise," Mar. 30, 1998, pp. 1-7.

Anthony Anthony et al., Pending specification, claims, figures for U.S. Appl. No. 10/237,079, Claims 21-81; filed Sep. 9, 2002.

David Anthony et al., Pending specification, claims, figures for U.S. Appl. No. 10/766,000, Claims 1-63; filed Jan. 29, 2004.

William Anthony, Pending specification, claims, figures for U.S. Appl. No. 10/399,630, Claims 1-35; filed Aug. 27, 2003.

Anthony Anthony et al., Pending specification, claims, figures for U.S. Appl. No. 10/432,840, Claims 1-39; filed May 28, 2003.

William Anthony, Pending specification, claims, figures for U.S. Appl. No. 10/443,482, Claims 1-25; filed Jun. 12, 2003.

Anthony Anthony et al., Pending specification, claims, figures for U.S. Appl. No. 10/435,199, Claims 1-32; filed May 12, 2003.

Anthony Anthony et al., Pending specification, claims, figures for U.S. Appl. No. 10/115,159, Claims 1-31; filed Apr. 2, 2002.

Anthony Anthony et al., Pending specification, claims, figures for U.S. Appl. No. 10/189,338, Claims 1-69; filed Jul. 2, 2002.

Anthony Anthony et al., Pending specification, claims, figures for U.S. Appl. No. 10/189,339, Claims 1-41; filed Jul. 2, 2002.

Anthony Anthony et al., Pending specification, claims, figures for U.S. Appl. No. 10/479,506, Claims 1-46; filed Dec. 10, 2003.

Anthony Anthony, Pending specification, claims, figures for U.S. Appl. No. 10/443,764, Claims 26-40; filed Sep. 16, 2003.

Anthony Anthony, Pending specification, claims, figures for U.S. Appl. No. 10/443,792, Claims 1-41; May 23, 2003.

Anthony Anthony, Pending specification, claims, figures for U.S. Appl. No. 10/443,788, Claims 1; 21-45; filed May 23, 2003.

Anthony Anthony et al., Pending specification, claims, figures for U.S. Appl. No. 10/443,778, Claims 1; 21-59; filed May 23, 2003.

Anthony Anthony et al., Pending specification, claims, figures for U.S. Appl. No. 10/460,361, Claims 1-16; filed Jun. 13, 2003.

Anthony Anthony et al., Pending specification, claims, figures for U.S. Appl. No. 10/705,962, Claims 19-33; filed May 25, 2005.

Anthony Anthony, Pending specification, claims, figures for U.S. Appl. No. 10/369,335, Claims 1-20; Feb. 18, 2003.

Anthony Anthony et al., Pending specification, claims, figures for U.S. Appl. No. 09/647,648, Claims 1-48; filed Nov. 17, 2000.

Anthony Anthony, Pending specification, claims, figures for U.S. Appl. No. 10/328,942, Claims 1-20; filed Dec. 23, 2002.

Anthony Anthony et al., Pending specification, claims, figures for U.S. Appl. No. 09/632,048, Claims 1-20; filed Aug. 3, 2000.

Anthony Anthony et al., Pending specification, claims, figures for U.S. Appl. No. 09/996,355, Claims 1-73; filed Nov. 29, 2001.

Willian Anthony, Pending specification, claims, figures for U.S. Appl. No. 10/023,467, Claims 1-20; filed Dec. 17, 2001.

Jan. 1, 2005, Weir, et al., "DesignCon 2005, High Performance FPGA Bypass Networks".

Apr. 25, 2002, Pending claims 1-40 and figures (3 pages) for U.S. Appl. No. 10/399,590; the specification is contained in WO 02/33798, filed Oct. 17, 2001, which is the published version of PCT/US01/32480, which is Neifeld Reference: X2YA0015UPCT-US, which is reference F-063 in the Information Disclosure Statement filed Apr. 23, 2004.

Feb. 11, 2005, PCT International Search Report for PCT/US04/00218.

Feb. 18, 2005, PCT International Search Report for PCT/US04/14539.

Mar. 24, 2005, Australian Patent Office Examination Report for SG 200303041-8.

Apr. 11, 2005, PCT International Search Report for PCT/US04/18938.

Nov. 2000, Muccioli, "EMC Society Seattle and Oregon Chapters—New X2Y Filter Technology Emerges as Singles Component Solution for Noise Suppression".

Sep. 27, 2005, PCT Corrected IPER for PCT/US04/00218.

Nov. 8, 2005, Supplementary Partial European Search Report EP 99916477.

Oct. 27, 2005, Supplementary European Search Report EP 98915364.

Dec. 9, 2005, PCT ISR for PCT/US04/39777.

* cited by examiner

SHIELDED ENERGY CONDITIONER

CROSS REFERENCE TO RELATED APPLICATIONS

This application claims priority to U.S. provisional application Ser. No. 60/472,113, filed May 21, 2003, U.S. provisional application Ser. No. 60/445,802, filed Feb. 10, 2003, and U.S. provisional application Ser. No. 60/443,855, filed Jan. 31, 2003, and the contents of these applications are incorporated herein by reference.

BACKGROUND OF THE INVENTION

This invention relates to electrical technology. More specifically, this invention relates to low inductance devices and energy conditioning.

DISCUSSION OF THE BACKGROUND

The word "terminal" means electrically conductive material at the point at which current enters or leaves an electrical device.

The terms "X" capacitor and "line to line capacitor" both mean a two terminal passive lumped circuit element having a capacitance value across the two terminals wherein the two terminals are connected in parallel configuration with a circuit load device. X capacitors are primarily used to prevent electrical droop across loads. That is, X capacitors are typically used to provide storage of charge to be used as a source or sink of electrical energy. An X capacitor can also be formed including a conductive shield separating at least two electrodes.

The terms "Y" capacitor and "line to ground capacitor" both mean a two terminal passive lumped circuit element having a capacitance value across the two terminals wherein one of the two terminals is connected to a line which is located in a circuit path between a source and a load and the other terminal is connected to an electrically conductive structure such as a metal layer on a PC board that, in lumped circuit diagrams, is usually shown as a ground. However, the voltage potential of the alleged ground may vary depending upon the amount of charge it receives or distributes. In applications, the alleged ground typically is one of an earth ground, a floating ground, and a chassis ground, and each one of these types of grounds could function as a circuit voltage reference. Y capacitors are primarily used to filter noise from signals.

The term "plate" is used throughout to refer to structure typically formed by layering processes. Use of the term "plate" herein means structures that are integrated during their formation. The term plate as used herein means a structure with at least two relatively large area major surfaces and one or more relatively smaller area edge surfaces. Each major surface may but need not be flat.

Energy conditioning means at least one of filtering, decoupling, and transient suppression of electrical energy propagating between a source and a load.

Filtering means modifying the frequency spectrum of a signal.

Decoupling is a term typically applied to active circuitry. In such circuitry, active devices change their properties, such as trans-conductance, which affects voltage on coupled elements. Decoupling means the minimization of the affects on the voltage of coupled elements due to the changes in the active circuitry.

Transients include energy anomalies and energy spikes due to external effects, such as static discharges and parasitics, such as self induction induced in a circuit.

U.S. Pat. Nos. 6,018,448 and 6,373,673 disclose a variety of devices that provide electrical energy conditioning. The teachings of U.S. Pat. Nos. 6,018,448 and 6,373,673 are incorporated herein by reference.

The novel inventions disclosed herein are structures that have certain performance characteristics that significantly improve at least the decoupling aspect of electrical energy conditioning compared to the devices described above.

SUMMARY OF THE INVENTION

An object of the invention is to provide a novel structure, a method of making the structure, and a method of using the structure, wherein the structure has a certain capacitance and provides energy conditioning that results in an ultra high insertion loss and improved decoupling.

Another object of the invention is to provide a circuit including a novel structure of the invention, a method of making the circuit, and a method of using the circuit.

Additional objects of the invention are to provide devices, circuits, and methods of using them that provide improved energy conditioning over a wide frequency range.

These and other objects of the invention are provided by a structure comprising a first electrode including a first electrode plate, a second electrode including a second electrode plate, and an electrically conductive shielding including a center shield portion between the first electrode plate and the second electrode plate and outer shield portions facing sides of the first electrode plate and the second electrode plate opposite the sides facing the center shield portion, wherein the elements of the structure have certain geometric values, relative values, relative positions, and shapes.

Generally speaking, plates of the first electrode receive electrical energy only along a conductive path that connects to only a portion of relatively long sides of the plate. Similarly, generally speaking, the first electrode receive electrical energy only along a path that connects to only a portion of relatively long sides of the plate.

Preferably, substantially all plates of the first electrode have substantially the same shape and are stacked vertically aligned with one another. Preferably, substantially all plates of the second electrode also have substantially the same shape and are stacked substantially vertically aligned with one another. However, plates of the first electrode and the second electrode may each have an axis of symmetry or a plane of symmetry. If so, plates of the second electrode may be oriented in the plane of the plates and inverted about the axis of symmetry or plane of symmetry relative to a plate of the first electrode.

These and other objects of the invention are provided by a structure comprising:

a first electrode including (A) a first electrode first plate, said first electrode first plate defining (1) a first electrode first plate an inner surface, (2) a first electrode first plate outer surface, and (3) a first electrode first plate edge surface defined by perimeters of said first electrode first plate inner surface and said first electrode first plate outer surface and (B) a first electrode contact region having a first electrode contact region surface for electrically contacting said first electrode;

a second electrode including (A) a second electrode first plate, said second electrode first plate defining (1) a second electrode first plate an inner surface, (2) a second electrode first plate outer surface, and (3) a second electrode first plate edge surface defined by perimeters of said second electrode first plate inner surface and said second electrode first plate outer surface and (B) a second electrode contact region having a second electrode contact region surface for electrically contacting said second electrode;

a shielding electrode including (1) an inner shielding plate, (2) a first outer shielding plate, (3) a second outer shielding plate, and (4) a shielding electrode contact region having a shielding electrode contact region surface for electrically contacting said shielding electrode;

wherein said first electrode first plate inner surface faces said second electrode first plate inner surface;

wherein (A) said inner shielding plate is between said a first electrode first plate inner surface and said second electrode first plate inner surface, (B) said first outer shielding plate is faced by said first electrode first plate outer surface, and (C) said second outer shielding plate is faced by said second electrode first plate outer surface; and wherein the elements of said structure have certain geometric values, relative values, relative positions, and shapes.

Hereinafter electrodes of the structures of the invention other than the shielding electrode are sometimes referred to as non-shielding electrodes in order to distinguish them from the shielding electrode. A structure of the invention may include a plurality of shielding electrodes. A structure of the invention may include a plurality of non-shielding electrodes.

The structure may also include, in the stack of electrode plates, additional first electrode plates of the first electrode, second electrode plates of the second electrode, and shielding electrode plates of the shielding electrode. The shield electrode may include shield electrode terminals, which may be in the shape of caps, and which include surfaces facing edges of plates of the first and second electrodes and surfaces defining a portion of the surface of the structure. The shield electrode terminals may also include surfaces facing portions of outer surfaces of plates of the first and second electrodes. The structure may have some of its surface regions defined by electrically insulating material. Each shielding electrode may be in the shape of a cap.

The structure preferably has an electrically insulating material between the plates that thereby substantially prevents electrons from moving from one electrode through the insulating material to another electrode. The insulating material may be any material that has a dielectric constant. Examples of the insulating material are air, which has a dielectric constant of one, ferro-magnetic material, ferrite material, diamond material, NPO dielectric material, COF dielectric material, and X7R. X7R has a dielectric constant of about 4600.

The certain geometric values, relative values, relative positions, and shapes of structures of the invention include shapes of each of the plates of at least the first and second electrodes in the plane defined by the major surfaces of those plates, the locations and relative extensions of the electrode contact regions where electrical energy connects to those plates. In addition, the shapes of the plates include the thickness of the plates. The relative values include the spacings between the plates and the alignment of plates relative to one another.

In one embodiment, plates of the invention have a finger-like shape, and are configured to define combs.

The structures of the invention may include additional internal structural elements, such as electrically conductive wire lines, insulating portions and electrode edge interconnection structures. The structures of the invention may also include electrode terminals. The electrode terminals are conductive structure designed for contact and electrical connection to other circuit elements. The structures of the invention may also include apertures which may be lined with either non-conductive or conductive material, and which may be either partially or entirely filled with either non-conductive or conductive material. These apertures and their contents may serve the purpose of conducting electrical energy from outside the structure to one or more plates of electrodes inside the structure. Plates of the structure may include interior surfaces defining apertures in the plates through which electrically conductive wire lines extend. The material inside the apertures themselves can be made conductive and can serve in place of conductive wires. These types of apertures are known as conductive vias. Various apertures can also have portions that are either non-conductive and conductive areas that allow electricity to propagate from and to predetermined areas of electrodes to which these apertures pass thru. Electrically conducting wire lines may electrically connect to plates of the same electrode while extending through apertures in plates of other electrodes and remaining insulated from those other electrodes. In embodiments including an electrode terminal, the electrode terminal may electrically interconnect plates of the same electrode to one another, and physically and connect to edges of plates of the electrode. The wire lines may be either formed and then inserted into the apertures or formed in the apertures.

The plates of the shielding electrode are electrically connected to one another. The plates of the shielding electrode preferably substantially shield each plates of each non-shielding electrode from one another. At least one plate of a non-shielding electrode is substantially shielded by a shielding electrode from every other plate of the non-shielding electrodes. The plates of the shielding electrode and at least a conductive structure electrically connects the plates of the shielding electrode to each other in order to substantially shield the plates of the non-shielding electrodes from one another.

A first level interconnect is a structure or device that provides an initial circuit connection to an integrated circuit. In use as intended, a first level interconnect has energy pathways that connect to at least an energy source and/or to at least to an energy return.

An interposer is a structure or device that provides a circuit connection to an integrated circuit.

A structure of the invention may be formed as a discrete component, such as a component suited for connection to a PC board. Alternatively, a structure of the invention may be formed into and form part of another structure, such as a PC board, a first level interconnect, an interposer, or an integrated circuit, including monolithic integrated circuits. In discrete component embodiments of the invention, the first electrode contact region surface defines a portion of a surface of the structure; the second electrode contact region surface defines a portion of the surface of the structure; and the shielding electrode contact region surface defines a portion of the surface of the structure.

Discrete component and PC boards that incorporate the novel structures of the invention may be formed by conventional multiple-layering, screening, laminating and firing techniques.

In either discrete or non-discrete arrangements of the novel stuctures employed for applications including, PC board and/or integrated circuit embodiment, certain ones of the electrode contact region surfaces that define a portion of the surface of the structure do not exist, per se. This is because the regions where those surfaces would otherwise define termination of a discrete component are formed in contact with electrically conductive material connecting to vias and/or extending from and/or through some portion of the PC board, substrate, first level interconnect, interposer and/or integrated circuit beyond the regions containing the first electrode, the second electrode, and/or the shielding electrode. Electrodes used could include arrangements with or without holes (apertures) and any combination of such are fully contemplated by the inventors.

Preferably, the inner shielding plate extends, in the plane defined by its major surfaces, beyond the edges of adjacent plates of the first and second electrodes such that, with the possible exceptions noted below, any line passing through both of the adjacent plates (i.e., a plate of the first electrode and a plate of the second electrode) also passes through and/or contacts the inner shielding plate. An exception exists wherein, in some embodiments, relatively small regions of the plates of each of the first and second electrodes extend beyond the extension of the shield plates. The relatively small portions of the plates of the first and second electrodes that extend beyond the extension of the shield plates contact either an electrode edge interconnection structure or an electrode terminal. The edge electrode interconnection structure functions to electrically connect substantially all plates of the first electrode to one another and/or substantially all plates of the second electrode to one another. In addition or alternatively, at least a portion of the inner shielding plate generally extends a distance beyond the extension of adjacent plates of the first and second electrodes by at least one, preferably at least 5, more preferably at least 10, and most preferably at least 20 times the distance separating the inner shielding plate from an adjacent plate.

The electrode edge interconnection structure and/or the electrode terminal are structures that electrically contact one or more edges of all or substantially all of the plates of an electrode thereby electrically connecting the plates that make up one of the electrodes to one another. The electrode edge interconnection structure and/or the electrode terminal of one electrode does not contact the plates of any other electrode. Electrode terminals typically exist in discrete components.

In PC board and integrated circuit embodiments of structures of the invention, there may be no electrode edge interconnection structure or electrode terminal. Instead, typically, there will be structure electrically interconnecting all plates of the same electrode which includes electrically conducting wire lines that connect to plates of the same electrode. The electrically conducting wire lines that connect to plates of one electrode do not electrically connect to plates of other electrodes.

Preferably, the electrically conducting wire lines connected to plates of one electrode pass through apertures in plates of other electrodes such that those wire lines do not electrically connect to the plates of the other electrodes. Other embodiments include arrangements with and arrangements without electrically conducting wire lines, and any combination of such are contemplated.

In certain embodiments of structures of the invention, the shield plates may be interconnected at their periphery by a sufficient density of electrically conducting wire lines such that the shielding electrode provides a Faraday cage effect to the first electrode and the second electrode. Typically, the density of electrically conducting wire lines can be made sufficient to provide a Faraday cage effect to the first electrode and the second electrode by spacing at least one electrically conducting wire line at predetermined intervals or near the periphery of the shielding electrode plates.

In some embodiments, it is preferable that the density of electrically conducting wire lines that electrically connect to the shielding electrode and surround the plates of the first electrode and the second electrode is at least one per centimeter, preferably at least one every two millimeters, and more preferably, at least one every millimeter. In these same embodiments, there may also be at least one and preferably several electrically conducting wire lines electrically connecting to plates of the first electrode. These electrically conducting wire lines pass through apertures and do not electrical connect to plates of the other electrodes. In these same embodiments, there may also be at least one and preferably several electrically conducting wire lines electrically connecting to plates of the second electrode and passing through apertures and not electrically connecting to plates of the other electrodes. Preferably, any electrically conducting wire line that connects to one plate of an electrode connects to substantially all of the remaining plates of that electrode.

Preferably, the electrically conducting wire lines are oriented such that they extend in the direction substantially non-parallel to the plane defined by at least one plate of one electrode of the structure. For example, the electrically conducting wire lines may be oriented substantially perpendicular to a plane defined by a major surface at least one plate of one electrode of the structure. Preferably, the electrically conductive wire lines define either a generally circular cross-section, a generally rectangular cross-section, or a strip shaped cross-section.

Additional plates of the electrodes may exist in the structure in a stacked formation such that major surfaces of plates oppose one another. These additional plates of the electrodes include the aforementioned three plates of the shielding electrode interleaved between the first plate of the first electrode and the second plate of the second electrode. The sequence of the additional plates of the structure may include the following, in repetitions: (1) a plate of the first electrode, followed by a shield plate, followed by a plate of the second electrode, followed by a shield plate; (2) a plate of the first electrode followed by one, two, three, four, or five shield plates, a plate of the second electrode followed by one, two, three, four, or five shield plates; (3) a plate of either the first or second electrode followed by one, two, three, four, or five shield plates, or more, another plate of the first or second electrode followed by one, two, three, four, or five shield plates, or more. Preferably, there are tens or hundreds of the repetitions of plate sequences noted above, in each structure. Preferably, the stack of shielding electrode plates in each structure also terminates with at least one shield plate.

Alternatively, the foregoing sequences of plates may entirely replace and be in lieu of three plates of the shielding electrodes interleaved between the first plate of the first electrode and the second plate of the second electrode.

Moreover, plates of any one electrode may be stacked such that the respective perimeter of each plate of the same electrode is substantially aligned or superposed with the other plates of the same electrode, even for plates separated from one another within a stack of plates. For example, plates of one electrode may have their major surfaces all rectangular in shape and the same size, and the rectangular plates may have the long axis of the rectangle aligned with one another. Plates may alternatively be hexagonal, circular, octagonal, pentagon, and a variety of other shapes that can be positionally and rotationally aligned.

Furthermore, plates of one electrode may be aligned either positionally or rotationally to plates of another electrode, for example along axis of symmetry defined in the plane of the plates by the shape of the plates. In addition, plates of one electrode may be aligned offset laterally in position or rotationally skewed relative to plates of another electrode.

Preferably, there is always at least one shield plate between any two plates of the first electrode, the second electrode or the first and second electrodes. Preferably, there is always at least one shield plate exterior to all plates of the first and second electrodes, i.e., outer shield plates. There may be two, three, four, or five shield plates exterior to all plates of the first and second electrodes on either or both ends of the stack of plates.

Preferably, all plates of the first electrode have substantially (within manufacturing tolerances) the same dimensions and shape as one another, all plates of the second electrode have substantially (within manufacturing tolerances) the same dimensions and shape as one another, and generally all plates of the shielding electrode have substantially (within manufacturing tolerances) the same dimensions and shape as one another, with the exception of the outer shield layers. The outer shield layers, which are those layers exterior to all plates of the first electrode and the second electrode, may extend further in the plane defined by the plate surfaces than other plates of the shielding electrode. Preferably, all of the plates are substantially planar, that is, have plate surfaces that are flat, within manufacturing tolerances.

Additional embodiments of the invention include in combination with any integral structure of the invention a conductive area found beyond the structure such as on a first level interconnect, such that the conductive area serves as a final shielding plate for the shielding electrode of the structure of the invention. All plates of the first electrode and all plates of the second electrodes may also be of substantially the same dimensions and shape as one another. All plates of the first electrode and all plates of the second electrodes may also be positioned complementary relative to one another and paired.

The plate thicknesses vary with the type of fabrication. For discrete components fabricated by thick film technologies, such as layering and subsequent firing, each layer is typically between 0.5 and 30 microns, more preferably between 1 and 10 microns. However, the preferred layer thickness is a function of the conductivity of the plate layers and the area of the planar surface of each plate such that, the preferred thickness decreases as the planar dimensions of the plates decrease or the conductivity of the material forming the plates increases. Thus, smaller structures, such as structures formed by semiconductor fabrication, including lithographic processes, the preferred plate thicknesses may be as small as a few tens or hundreds of angstroms.

The thickness of insulating layers between the conductive plates of the first, second, and shielding electrodes are of the same magnitude as the thickness of the conductive plates. However, for structures designed for higher voltage circuits, the insulating layers may be thicker than the thickness of the plates of the conductive layers in order to avoid dielectric breakdown in the insulating layers since thicker insulating layers reduce the electric field strength for a given voltage. Structures designed for higher voltage circuits may also incorporate higher dielectric breakdown dielectric materials, such as Diamond. For structures designed for use in lower voltage circuits, the thickness of the insulating layers may be substantially less than the thickness of the conductive plates. Particularly, for devices fabricated in semiconductor layered structures, such as in integrated circuits, the insulating layers may be less than one half, preferably less than one fifth of the thickness of the conductive plate layers. In digital semiconductor applications, wherein switching voltages are typically less than 5 volts, insulating layer thicknesses are preferably less than 20 microns, more preferably less than 5 microns, still more preferably less than 2 microns, and most preferably less than 0.5 microns.

In discrete structures, the electrical energy typically enters the structures at the electrical edge interconnection structure. In non-discrete structures, the electrical energy enters the structure along a first set of one or more conducting pathways that are electrically connected to the first electrode, a second set of one or more conductive pathways that are electrically connected to the second electrode, and a third set of one or more conductive pathways that are electrically connected to the shielding electrode. Any one or more of the first, second, and third sets of conductive pathways may include at least one conductive pathway extending in substantially the same plane as a plane defined by a major surface of a plate of one of the electrodes of the structure. Any one or more of the first, second, and third sets of conductive pathways may include at least one conductive pathway extending in a direction that is substantially non-parallel, such as substantially perpendicular, to the plane defined by a major surface of a plate of one of the electrodes of the structure. For example, the first, second, or third set of conductive pathways may each include a lithographically defined conductive line in a plane defined by a major surface of one of the plates, or they may each include conductive material filling a via that extends non-parallel, such as substantially perpendicular, to the plane.

The regions of conductive pathways where electrical energy enters the volume surrounded by the plates of the first, second, and shielding electrodes are referred to herein below as the energy entry regions of the first and second electrodes.

An important feature of structures of this invention are relationships between the locations on the plates of the energy entry regions and the shapes of the plates. One novel limitation associated with certain structures of the invention relates to the distance between the energy entry regions of the first and second electrodes and the extension of the plates in a direction perpendicular to a line connecting the projection of the energy entry regions of the first and second electrodes onto a plane parallel to the major surface of the plates.

More specifically, define a line segment, connecting the projection onto a plane parallel to a major surface of a first plate of the first electrode, of the energy entry regions of the first and second electrodes of the structure, as an energy pathway line segment.

Also, define the length of the energy pathway line segment as the energy pathway line segment length.

Also, define the length of any line segment perpendicular to the energy pathway line segment that terminates at an intersection with the edge of one plate of the first or second electrode as an energy perpendicular line segment.

Finally, define the longest of the energy perpendicular line segments that intersects the energy pathway line segment as the maximal energy perpendicular line segment, and define the length of that segment as the maximal energy perpendicular line segment length.

A novel limitation of certain structures of this invention is that the maximal energy perpendicular line segment length is equal to or greater than the energy pathway line segment length.

Another novel limitation of certain structures of this invention that have first and second electrodes including at least one generally rectangular plate is that the energy entry region of the electrode including the generally rectangular plate is closer to a longer side of the generally rectangular plate than to either of the short sides of the generally rectangular plate.

Another novel limitation of certain structures of this invention that have first and second electrodes including at least one generally rectangular plate is that the energy entry region of the electrode including the generally rectangular plate is closer to the center of a longer side of the generally rectangular plate than to the ends of the longer side.

Another novel limitation of certain structures of this invention that have first and second electrodes including at least one generally rectangular plate is that the energy entry region of the electrode including the generally rectangular plate extends along a longer side of the generally rectangular plate by a fraction of the length of the longer side of at least 1/20, more preferably at least 1/10, more preferably at least about 1/5 and preferably less then about 2/3.

Another novel limitation of certain structures of this invention that have first and second electrodes including at least one generally rectangular plate is that there are a plurality of the energy entry regions of the electrode including the generally rectangular plate, and the interval between at least two of those energy entry regions extends in the direction defined by the longer side of the generally rectangular plate by a fraction of the length of the longer side of at least 1/20, more preferably, at least 1/10, more preferably at least about 1/5 and preferably equal to or less then 1 and preferably less than about 2/3.

Another novel limitation of certain structures of this invention that have first and second electrodes is that they are shaped, they have four sides that make up a perimeter, with two side portions of the perimeter longer than the other two side portions of the perimeter.

One or more energy entry regions may be in a plane substantially parallel to a plane defined by a major surface of a plate of the first or second electrode, or in a plane perpendicular to a plane defined by a major surface of a plate of the first or second electrode.

The inventor recognizes that each energy entry region is not a mathematical point and instead has a certain spatial extent. Accordingly, and only to the extent necessary to determine whether the novel geometric limitations disclosed herein above involving the relative positions and locations of the energy entry regions exist in a certain structure, associate with the one or more energy entry regions of an electrode a mathematical point that minimizes the mean root square distance to the loci of all points associated with the or those energy entry region or regions. In common language, associate one point most central to the energy entry region or regions connecting to an electrode, and then use the corresponding points defined for each of the electrodes (1) to define the aforementioned line segments and (2) to determine if the energy entry region is closer to a longer side of a generally rectangular plate than to either of the shorter sides of the generally rectangular plate.

For structures of the invention having electrode edge interconnection structure or electrode terminals, the length of the energy pathway line segment may be equal to or greater than the length of a plate of the first or second electrode. In these structures, a novel limitation of this invention is that a first length defined as the length of a plate along the energy pathway line segment is equal to or shorter than a second length defined as the length of the plate in the direction perpendicular to the energy pathway line segment. In these structures, another novel limitation of this invention is that a first length defined as the length between electrode edge interconnection structure or electrode terminal of the first electrode and the second electrode is equal to or shorter than a second length defined as the length of the plate in the direction perpendicular to a plane defined by a major surface of the edge interconnection structure or electrode terminal and parallel to a plane defined by a major surface of a plate of the first or the second electrode. Preferably, the ratio of the second length to the first length is greater than one, more preferably greater than 1.1, more preferably greater than 1.2, 1.3, 1.4, 1.5, 2, and most preferably greater than 3. Preferably, in view of manufacturing limitations, this ratio is less than 100.

The foregoing lengths of the energy pathway line segment and the energy perpendicular line segments are defined relative to a single plate of the structure.

The ratio of the length of the maximal energy perpendicular line segment to the length of the energy pathway line segment is referred to herein as the energy pathway ratio. Preferably the energy pathway ratio is greater than 1, preferably, greater than 1.1, more preferably greater than 1.2, 1.3, 1.4, 1.5, 2, and most preferably greater than 3. Preferably, in view of manufacturing limitations, this ratio is less than 100.

The shape of the plates of the first and second electrodes vary from generally oval to generally rectangular. Preferably, the shapes of the plates of the first and second electrodes are generally rectangular having the edges of the plates rounded thereby avoiding high radius of curvature corners. Preferably, edge connection regions of the plates protrude in the plane of each plate, relative to the rest of the same edge of the same plate, along the direction of the energy pathway line segment. The edge protrusion distance is sufficient to enable connection of that plate to the edge interconnection structure or electrode terminal.

The actual dimensions of each plate along the energy pathway line segment and the energy perpendicular line segment depends upon the actual embodiment which in turn depends upon intended usage criteria including the desired DC capacitances of the structure. For discrete components, the typical actual edge parallel dimension and edge perpendicular dimensions range from about a tenth of a millimeter to several centimeters. However, for large capacitance high power applications, the inventors recognize that the actual edge parallel dimension and edge perpendicular dimensions may extend to tens of centimeters or meters. For example, very large capacitance structures may be employed in power grids to reduce the effect on line voltage of a rapid change in load.

The conductive material running non-parallel, for example, perpendicular, to the plane defined by the large surfaces of the plates without also contacting plates in the stack of plates that form part of the other electrodes is referred to herein as an edge protrusion connection.

Alternatively or in addition to including edge protrusion regions, the plates of the same electrode may be electrically connect to one another by an electrically conducting material extending non-parallel, such as perpendicular, to the plane of the plates that contacts the plates of the same electrode and passes through apertures of plates of the other electrodes such that the electrically conducting material extending non-parallel, such as perpendicular, to the plane of the plates do not electrically contact plates of the other electrodes.

The shape of the plates of the shielding electrode are generally similar to the shape of the plates of the other electrodes. However, preferably, the shielding plates generally extend in the plane beyond the extension of the plates of the first electrode and the second electrode. However, the shielding plates may not extend beyond the extension of the edge protrusion regions so that edge protrusion regions of each of the first electrode and the second electrode may electrically connect the plates of each electrode to one another without also electrically connecting to the shielding electrode.

In one preferred embodiment, the edge protrusion connection of each of the first electrode and the second electrode has a surface that also defines a part of the surface of the structure. That surface enables electrical connection of that electrode to a circuit. In this preferred embodiment, the surface edge protrusion connection that also defines a part of the surface of the structure extends over three non-parallel, such as perpendicular, surfaces of the structure such that two of those surfaces are parallel, to the planar dimensions of the plates of the electrodes.

Preferably, the shield plates of the shielding electrode generally extend in the plane of the plates beyond the extension of the plates of the first electrode and the second electrode, with exceptions for the edge protrusions of the first electrode and the second electrode. Moreover, the shielding electrode preferably also includes a shielding electrode edge connection that electrically connects the plates of the shielding electrode to one another. Preferably, the shielding electrode edge connection has a shielding electrode edge connection electrode surface that forms part of the surface of the structure. Preferably, the shielding electrode edge connection electrode surface extends in a first plane non-parallel, such as perpendicular, to the plane defined by the large area surfaces of plates. Preferably, the shielding electrode edge connection electrode surface also extends to part of both surfaces of the structure that are non-perpendicular, such as parallel, to the plane defined by the large area surfaces of the plates. Preferably, the shielding electrode edge connection electrode surface also extends to part of both surfaces of the structure that are non-parallel, such as perpendicular, to the planes defined by the large area surfaces of the plates and also non-parallel, such as perpendicular, to the first plane perpendicular to the plane defined by the large area surfaces of plates. Thus, in a preferred embodiment, the shielding electrode forms a part of the surface of the structure that covers one side of the structure. Preferably, the shielding electrode also forms a part of the surface of the structure that also covers the opposite side and/or complimentary sides of the structure. In some embodiments, performance of the structure may be improved by electrically connecting the shielding electrode to conductive material having substantial surface area outside of the shielding electrode. Preferably, the conductive material having substantial surface area outside of the shielding electrode has a surface area at least as large as the surface area of a plate of the shield electrode, more preferably at least 2, 3, 4, 5, 10, or 100 times the surface area of a plate of the shield electrode. Alternatively, electrically connecting the shielding electrode to conductive material having substantial surface area, the structure of the invention may be formed including the conductive material having the substantial surface area. Most preferably, the surface area of the conductive material external to the shielding electrode and electrically connected to the shielding electrode is large enough so that the conductive material acts as fixed voltage for the shielding electrode.

For all embodiments of the invention, preferably there is at least one shielding electrode plate between any plate of the first electrode and any plate of the second electrode. For all embodiments of the invention, preferably there is at least one shielding plate above all plates of both non-shielding electrodes and one shielding plate electrode below all plates of both the first and second electrodes.

In one aspect, the invention provides a structure comprising: a first electrode; a second electrode; and a shielding electrode; wherein at least one plate of said shielding electrode separates each plate of said first electrode from any plate of said second electrode; at least two plates of said shielding electrode sandwich between them all plates of said first electrode and said second electrode; and wherein said first electrode includes a first electrode plate having a first electrode plate major surface and at least one first electrode plate energy entry region, said second electrode includes a second electrode plate having at least one second electrode plate energy entry region; an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region; said energy pathway line segment having an energy pathway line segment length; a maximal energy perpendicular line segment corresponding to said energy pathway line segment, said maximal energy perpendicular line segment having a maximal energy perpendicular line segment length; wherein said maximal energy perpendicular line segment length is greater than said energy pathway line segment length.

Additional aspects of this invention include that the structure provides an insertion loss at ten megahertz across said first electrode and said second electrode of at least 80 dB; has a length of each energy perpendicular line segment is greater than said energy pathway line segment length; wherein said first electrode plate has only one first electrode plate energy entry region; wherein said first electrode plate has a plurality of first electrode plate energy entry regions; wherein said at least one first electrode plate comprises a first electrode plate necked region that defines an energy entry region of said first electrode plate; wherein said at least one first electrode plate intersects at least one wire line at an energy entry region intersection, said at least one wire line extends substantially perpendicular to said first electrode plate major surface, and said energy entry region intersection defines an energy entry region of said first electrode plate; wherein said first electrode comprises a plurality of first electrode plates and said at least one wire line intersects each one of said plurality of first electrode plates; wherein said energy entry region intersection does not contact a peripheral edge of said first electrode plate; wherein said first electrode comprises a first electrode plate having a thickness less than 50 microns; wherein said first electrode comprises a first electrode plate having a thickness greater than a few tens of angstroms; wherein said at least one first electrode plate comprises a first electrode plate necked region that defines at least part of an energy entry region of said first electrode; wherein said at least one first electrode plate is generally rectangular and has a first electrode plate longer side and two first electrode plate shorter sides adjacent said first electrode plate longer side; wherein said at least one first electrode plate has a first electrode plate region forming at least part of an energy entry region of said first electrode, and said first electrode plate region is closer to said first electrode plate longer side than to either of said two first electrode plate shorter sides; wherein said first electrode plate longer side has a first electrode plate longer side length, said at least one first electrode plate includes a first electrode plate region forming at least part of an energy entry region of said first electrode, and said first electrode plate region that extends along said first electrode plate longer side for a length of at least one twentieth of said first electrode plate longer side length; wherein said first electrode plate longer side has a first electrode plate longer side length, said at least one first electrode plate includes a first electrode plate region forming at least part of an energy entry region of said first electrode, and said first electrode plate regions extends along said first electrode plate longer side for a length of less than said first electrode plate longer side length; wherein said first electrode plate longer side has a first electrode plate longer side length, said at least one first electrode plate includes a first electrode plate region that forms at least part of an energy entry region of said first electrode, and said first electrode plate region extends along said first electrode plate longer side for a length of no more than two thirds said first electrode plate longer side length; wherein said at least one first electrode plate includes a first electrode plate region that forms at least part of an energy entry region of said first electrode, and said longer side has a longer side center and two longer side ends, and said first electrode plate region is closer to said longer side center than to either of said two longer side ends; wherein said structure forms a discrete component; wherein said structure forms part of an interposer or first level interconnect to an integrated circuit; wherein said structure forms part of an integrated circuit; wherein a ratio of said maximal energy perpendicular line segment length to said energy pathway line segment length is greater than 1.2; wherein ratios of lengths of all energy perpendicular line segments to said energy pathway line segment length are all greater than 1.5; wherein a ratio of said energy perpendicular line segment length to said energy pathway line segment length is greater than 2; wherein a ratio of said energy perpendicular line segment length to said energy pathway line segment length is less than 100; wherein said first electrode plate major surface has a generally rectangular shape; wherein said first electrode plate major surface has a generally oval shape; wherein said first electrode plate major surface has a neck that protrudes from the rest of said first electrode plate in a direction parallel to said energy pathway line segment; wherein the structure further comprises a first edge interconnection structure and wherein said neck forms an edge protrusion connection to said first edge interconnection structure; wherein said first electrode comprises a plurality of first electrode plates and said plurality of first electrode plates are connected to one another by conductive material extending perpendicular to said first electrode plate major surface; wherein said shielding electrode comprises a plurality of shielding electrode plates and said plurality of shielding electrode plates are connected to one another by conductive material extending perpendicular to said first electrode plate major surface; wherein said shielding electrode further comprises at least one terminal; wherein said at least two plates of said shielding electrode that sandwich between them all plates of said first electrode and said second electrode and said at least one terminal substantially enclose said first electrode and said second electrode; wherein said at least one terminal of said shielding electrode comprises at least a first shielding electrode terminal and a second shielding electrode terminal, and electrically conductive material extends exterior to said first electrode and said second electrode to connect said first shielding electrode terminal to said second shielding electrode terminal; and wherein the structure further comprises an electrically conductive element exterior to said first electrode and said second electrode which is electrically connected to said shielding electrode and which has a surface area of at least the area defined by a plate of said shielding electrode.

In another aspect, the invention provides a structure comprising a first electrode; a second electrode; and a shielding electrode; wherein at least one plate of said shielding electrode separates each plate of said first electrode from any plate of said second electrode; at least two plates of said shielding electrode sandwich between them all plates of said first electrode and said second electrode; and a first edge electrode interconnection structure electrically connecting plates of said first electrode to one another; a second edge electrode interconnection structure electrically connecting plates of said second electrode to one another; wherein said first electrode includes a first electrode plate having a first electrode plate major surface and at least one first electrode plate energy entry region including a first contact region in contact with said first edge electrode interconnection structure; wherein said second electrode includes a second electrode plate having a second electrode plate major surface and at least one second electrode plate energy entry region including a second contact region in contact with said second edge electrode interconnection structure; an energy pathway line segment is defined by a line segment terminating in regions defined by a projection onto a plane parallel to a plane defined by said first electrode plate major surface of (1) said first contact region and (2) said second contact region; said energy pathway line segment having an energy pathway line segment length; a maximal energy perpendicular line segment corresponding to said energy pathway line segment, said maximal energy perpendicular line segment having a maximal energy perpendicular line segment length; wherein said maximal energy perpendicular line segment length is greater than said energy pathway line segment length.

Additional aspects of this invention include the structure providing an insertion loss at ten megahertz across said first electrode and said second electrode of at least 80 dB; wherein length of each energy perpendicular line segment is greater than said energy pathway line segment length; and wherein first electrode plate has only one first electrode plate energy entry region.

In another aspect, the invention provides a method of making a structure comprising: forming a first electrode; forming a second electrode; and forming a shielding electrode; wherein at least one plate of said shielding electrode separates each plate of said first electrode from any plate of said second electrode; at least two plates of said shielding electrode sandwich between them all plates of said first electrode and said second electrode; wherein said first electrode includes a first electrode plate having a first electrode plate major surface and at least one first electrode plate energy entry region, said second electrode includes a second electrode plate having at least one second electrode plate energy entry region; an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region; said energy pathway line segment having an energy pathway line segment length; a maximal energy perpendicular line segment corresponding to said energy pathway line segment, said maximal energy perpendicular line segment having a maximal energy perpendicular line segment length; wherein said maximal energy perpendicular line segment length is greater than said energy pathway line segment length; wherein said forming steps include depositing, layer by layer, material for plates of said first electrode, said second electrode, and said shielding electrode to form a deposited structure.

Additional aspects of this invention include comprises depositing between layers of said first electrode, said second electrode, and said shielding electrode, at least one of insulating material and precursor for insulating material; the step of firing said structure; wherein said depositing includes depositing material in a vacuum; wherein said depositing includes depositing material from a vapor; further comprising depositing a resist, exposing a pattern in said resist, and removing resist corresponding to said pattern; further comprising at least one of depositing after removing said resist corresponding to said pattern and etching corresponding to said pattern; further comprising folding said deposited structure to form a folded structure; and further comprising rolling said deposited structure to form a generally cylindrically shaped rolled structure.

In another aspect, the invention provides a method of using a structure, said structure comprising a first electrode; a second electrode; and a shielding electrode; wherein at least one plate of said shielding electrode separates each plate of said first electrode from any plate of said second electrode; at least two plates of said shielding electrode sandwich between them all plates of said first electrode and said second electrode; and wherein said first electrode includes a first electrode plate having a first electrode plate major surface and at least one first electrode plate energy entry region, said second electrode includes a second electrode plate having at least one second electrode plate energy entry region; an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region; said energy pathway line segment having an energy pathway line segment length; a maximal energy perpendicular line segment corresponding to said energy pathway line segment, said maximal energy perpendicular line segment having a maximal energy perpendicular line segment length; wherein said maximal energy perpendicular line segment length is greater than said energy pathway line segment length; said method comprising electrically connecting said first electrode and said second electrode across a source and a load; and applying power from said source to said load.

Additional aspects of this method include connecting said shielding electrode to a relatively large metallic structure which is not electrically connected to either said first electrode or said second electrode; wherein said relatively large metallic structure is a chassis ground; wherein said relatively large metallic structure is an earth ground.

In another aspect, the invention provides a structure comprising a first electrode; a second electrode; and a shielding electrode; and wherein at least one plate of said shielding electrode separates each plate of said first electrode from any plate of said second electrode; wherein at least two plates of said shielding electrode sandwich between them all plates of said first electrode and said second electrode; and wherein said first electrode includes a generally rectangular plate having a longer side and two shorter sides, and an energy entry region of said first electrode is closer to a longer side of said generally rectangular plate than to either of said two shorter sides.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a generally rectangular plate, said generally rectangular plate having a longer side and a shorter side, and said longer side is longer than said shorter side, said longer side having a longer side first end, a longer side second end, and a longer side center; and wherein an energy entry region of said first electrode is closer to said longer side center than to either one of said longer side first end and longer side second end.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a generally rectangular plate having a longer side and a shorter side, and said longer sides is longer than said shorter side; and wherein an energy entry region of said first electrode extends along said longer side.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a plate having a longer side and a shorter side, said longer side is longer than said shorter side, and said longer side has a longer side length; and wherein there are a plurality of the energy entry regions for the first electrode, and the interval between at least two of said plurality of energy entry regions extends in a direction defined by the general extension of said longer side, and said interval extends for less than about ⅔ of said longer side length.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a first electrode plate and edge interconnection structure; and wherein a length of said first electrode plate along a direction of an energy pathway line segment of said first electrode plate is equal to or less than a length of said first electrode plate in a direction non-parallel to said energy pathway line segment and non-perpendicular to a plane defined by a major surface of said first electrode plate.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a first electrode plate and edge interconnection structure; and wherein a length of said first electrode plate along a direction of an energy pathway line segment of said first electrode plate is equal to or less than a length of said first electrode plate in a direction perpendicular to said energy pathway line segment and perpendicular to a plane defined by a major surface of said first electrode plate.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a first electrode plate and a first electrode terminal; wherein said second electrode includes a second electrode plate and a second electrode terminal; and wherein a length of a first line segment extending from said first electrode terminal to said second electrode terminal in a plane defined by said first electrode plate is equal to or shorter than a length of a second line segment extending rom said first electrode plate in a direction in said plane and perpendicular to said first line segment.

In another aspect, the invention provides a structure comprising a first electrode; a second electrode; and a shielding electrode; wherein at least one plate of said shielding electrode separates each plate of said first electrode from any plate of said second electrode; wherein at least two plates of said shielding electrode sandwich between them all plates of said first electrode and said second electrode; wherein said first electrode includes a first electrode plate and a first electrode terminal; wherein said second electrode includes a second electrode plate and a second electrode terminal; and wherein a length of a first line segment extending from said first electrode terminal to said second electrode terminal in a plane defined by said first electrode plate is equal to or shorter than a length of a second line segment extending rom said first electrode plate in a direction in said plane and non-parallel to said first line segment.

BRIEF DESCRIPTION OF THE DRAWINGS

These and other aspects of the inventions are described with reference to the following drawings wherein like reference numerals refer to identical or corresponding elements.

DETAILED DESCRIPTION OF THE EMBODIMENTS

Figure 1:
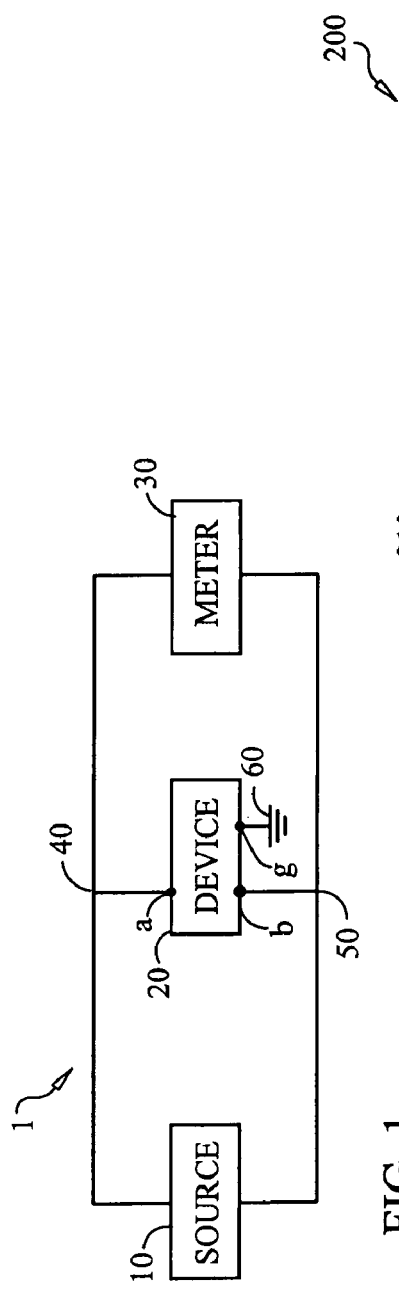
FIG. 1 is a schematic of a test circuit used to test insertion loss of devices.

FIG. 1 shows a schematic of test circuit 1 including source 10, device 20, meter 30, common points 40, 50, ground (or source or sink of charge) 60, and device contacts or terminals a, b, and g. Source 10 is a source capable of providing voltage, current, or power with specified frequency components. Meter 30 is a device capable of measuring transmission of the signal provided by source 10 across the a and b terminals of device 20.

Device 10 is a device which, in a lumped element theory, would be considered a three terminal device. Lumped element theory corresponds fixed values for inductance and/or capacitance with a physical structure of an element. A lumped element theory may not adequately describe the circuit properties of device 10.

Device 10 is a device which, in a distributed element theory, would be considered as having at least three terminals. Distributed element theory associates values for inductance and/or capacitance to each conductive portion of a circuit, such as in transmission line theory.

Device 10 may be a device which when energized, for example, becomes a voltage divider. When the energy potential measured across a source to meter line/load connection A from point 40 to a line having a meter to source return connection B from point 50 has a voltage V1, and the potential between these conductors and ground 60 is a voltage V2 being approximately half of the voltage V1, by interposing the shielding electrode structure (not shown) between non-shielding electrodes (also not shown), a phase balancing device and a voltage divider is created. It should be noted that this configuration can be easily and economically achieved using substantially less dielectric material disposed between non-shielding electrode plates relative to a shielding electrode plate to accommodate the voltage V2 as desired. It is of course recognized that the configuration or location and the numbers of shielding electrode plates could be modified to reflect or cause a change in the relative energized relationship between voltages V1 and V2.

Alternative novel structures of device 10 are described herein below.

Figure 2:
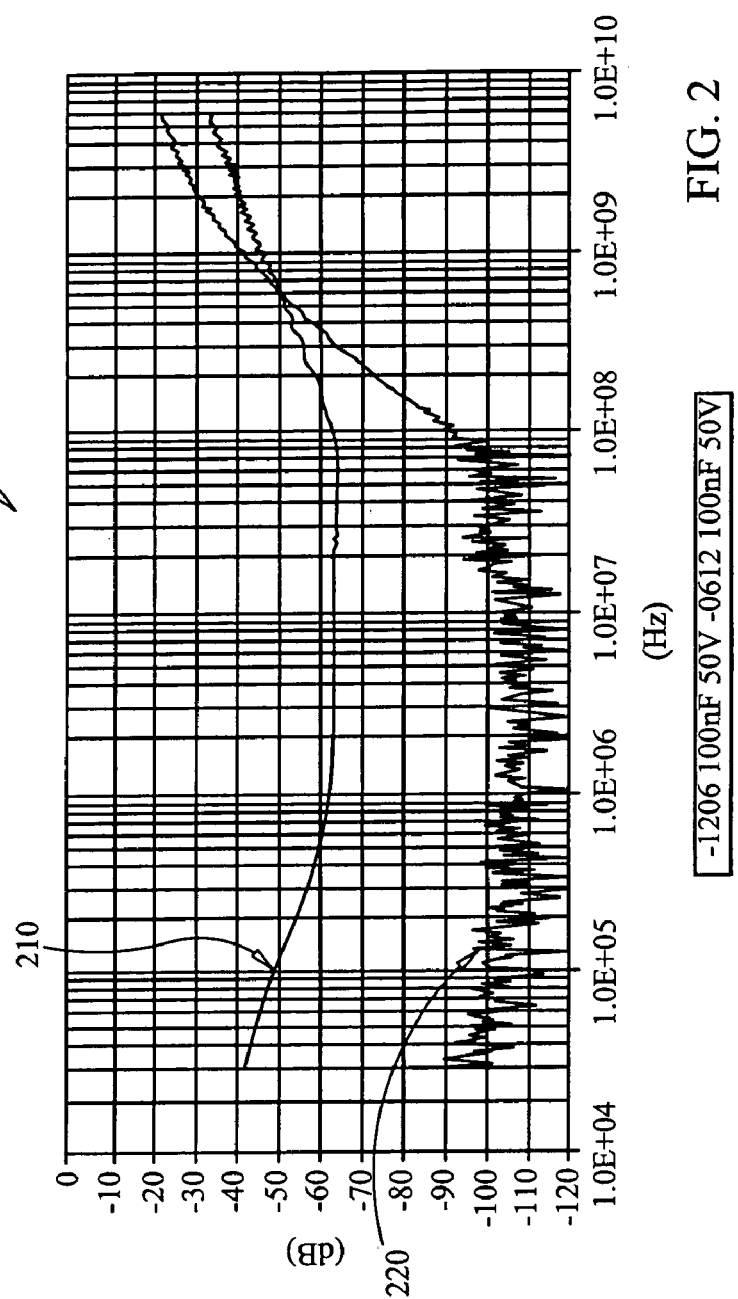
FIG. 2 is a graph showing measurement of insertion loss in a log sweep mode for two devices.

FIG. 2 is a graph 200 in which the x axis depicts frequency from ten thousand hertz to ten gigahertz and the y axis depicts transmission loss in dB from 0 to −120. Graph 200 shows curve 210 for a prior art device structure, device A, similar to structure 400a (see FIG. 4a) and curve 220 for a novel device structure, device B, similar to structure 400b (see FIG. 4b). Curves 210, 220, represent insertion loss data for a peak to peak voltage difference of 50 Volts. Both device structures A and B have the same nominal DC capacitance of 100 nano Farads as one another, include nominally the same composition of dielectric material as one another, and have nominally the same external dimensions of 3.2 by 1.6 by 1.1 millimeters as one another, with plates stacked along the 1.1 millimeter dimension.

Prior art device A has the same internal electrode layer configuration as device structure 400a (see FIG. 4a) except that it contains more electrode plate layers than device structure 400a. Novel device B has the same internal electrode layer configuration as device structure 400b (See FIG. 4b) except that it contains more electrode plate layers than device structure 400b.

Summary data comparing insertion loss for curves 210 (for prior art device A) and 220 (for novel device B) appears in the following chart. The data values shown below are based upon FIG. 2 and have an uncertainty of about 2 dB.

| Frequency (Khz) | Insertion loss Device A (dB) | Insertion loss data Device B (dB) | Difference |
|---|---|---|---|
| 30 | −42 | −95 | 53 |
| 100 | −50 | −105 | 55 |
| 1000 | −62 | −110 | 48 |

-continued

| Frequency (Khz) | Insertion loss Device A (dB) | Insertion loss data Device B (dB) | Difference |
|---|---|---|---|
| 10000 | −63 | −110 | 47 |
| 100000 | −63 | −90 | 27 |
| 200000 | −75 | −60 | 15 |
| 300000 | −65 | −56 | 11 |
| 400000 | −60 | −54 | 6 |
| 500000 | −51 | −51 | 0 |
| 1000000 | −42 | −45 | −3 |

Curve 220 shows an insertion loss for device B from about 30 kilo Hertz to about 100 mega Hertz that is at or below noise threshold of meter 30 of about −110 db.

Curves 210 and 220 show that the insertion loss of device A exceeds that of device B by at least about 64 dB over the range one mega Hertz to 100 mega Hertz. Curve 220 shows an insertion loss from one mega Hertz to 100 mega Hertz of no less than about −100 dB.

Curve 220 shows an insertion loss for novel device B that is greater than the insertion loss of curve 210 for device A over the frequency range 30 kilo Hertz to 500 mega Hertz. For frequencies from 30 kilo Hertz to 100 kilo hertz, the insertion loss of device A exceeds that of device B by at least 40 dB; for 30 kilo hertz to 10 mega Hertz by at least 30 dB; for 10 mega Hertz to 100 mega Hertz by at least about 25 dB; and for 30 kilo Hertz to 200 mega Hertz by at least about 10 dB.

Over the entire frequency range of 30 kilo Hertz to 100 mega Hertz the insertion loss of device A is greater than −60 dB, greater than −70 dB, greater than −80 dB, and greater than approximately −90 dB.

FIG. 2 shows that structures like structure 400b have an insertion loss that is substantially greater than the insertion loss of structures like structure 400a, for frequencies from just above zero to a few hundred mega Hertz.

This invention is directed to the differences in structures, like the differences in structures 400a and 400b, that provide the tremendously greater insertion loss of structures like novel device structure 400b relative to device structure 400a.

Figure 3:
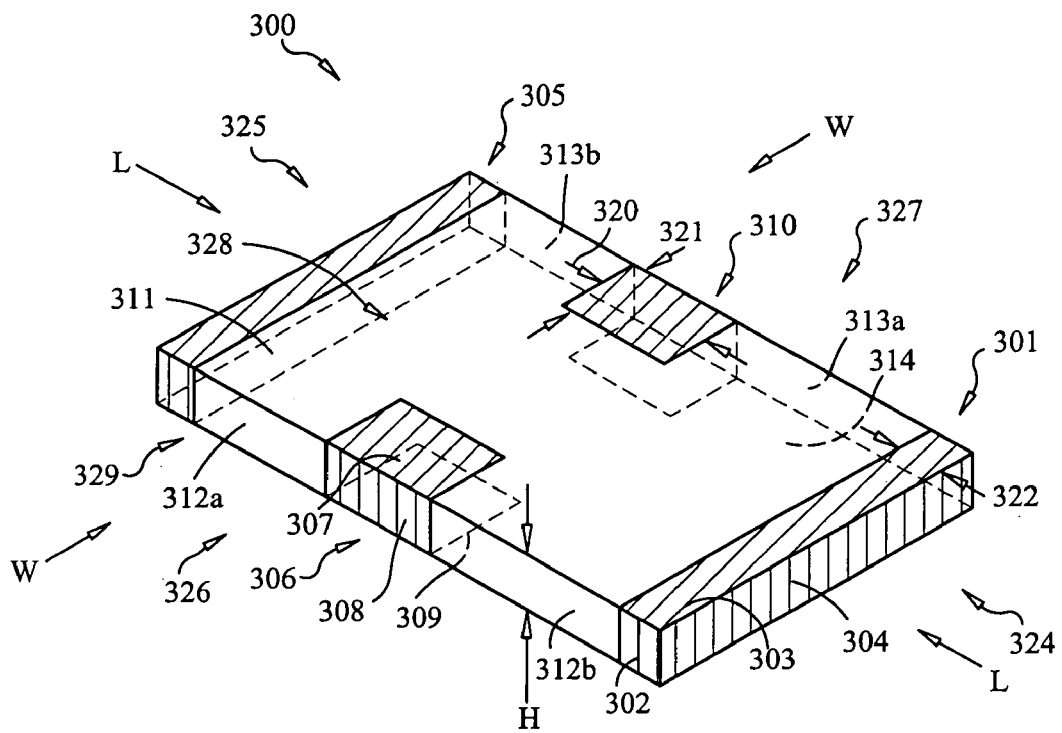
FIG. 3 is a perspective view of devices of the type tested using the circuit of FIG. 1 and for which insertion loss is shown in FIG. 2.

FIG. 3 shows external structure of both prior art device 400a and novel device 400b.

FIGS. 4a and 10–14 illustrate internal structure of a prior art device 400a.

FIGS. 4b and 5–9 illustrate the internal structure of novel device structure 400b.

FIG. 3 shows a perspective view of structure 300. The external structure of both devices 400a (see FIG. 4a) and 400b (see FIG. 4b) are the same as the external structure 300.

Structure 300 has edge interconnection structure in the form of side electrode terminals 301, 305, front electrode terminal 306, back electrode terminal 310. Side electrode terminal 301 includes side electrode terminal conductive portions 302, 303, 304, and a side electrode terminal conductive portion on the hidden face opposing side electrode portion 303. Front electrode terminal 306 includes front electrode terminal conductive portions 307, 308, 309. Side electrode terminal 305 and side electrode terminal 301 are mirror images of one another. Front electrode terminal 306 and back electrode terminal 310 are mirror images of one another.

Structure 300 has electrically insulating top surface portion 311, electrically insulating front surface portions 312a, 312b electrically insulating back surface portions 313a, 313b and electrically insulating bottom surface portion 314.

FIG. 3 also shows back electrode terminal side to side width 320 delimited by opposing arrows, back electrode terminal front to back width 321 delimited by opposing arrows, and side electrode terminal conductive portion side to side width 322 delimited by opposing arrows.

FIG. 3 also shows structure 300's side surfaces 324, 325, front surface 326, and top surface 328, and it identifies structure 300's back surface 327 and bottom surface 329. FIG. 3 also shows structure 300's side to side length L delimited by opposing arrows, front to back width W delimited by opposing arrows, and top to bottom height H delimited by opposing arrows.

Electrode terminals 301, 305, 306, 310 may be formed from any conductive material including elemental metals, alloys, and conductive plastics and polymers. Preferably, electrode terminals 301, 305, 306, 310 are formed from indium, aluminum, copper, nickel, cobalt, gold, platinum, paladium, iridium, ruthenium, or alloys containing at least one of those elements.

The electrically insulating surface portions 311, 312a, 312b, 313, and 314 may be formed from any dielectric material including for example inorganic oxides, nitrides, flourides, various ceramics and glasses, insulating polymers and resins, and, undoped insulating semiconductors such as silicon, carbon, silicon carbide, boron nitride, III–V semiconductors, and II–VI semiconductors.

Figure 4A:
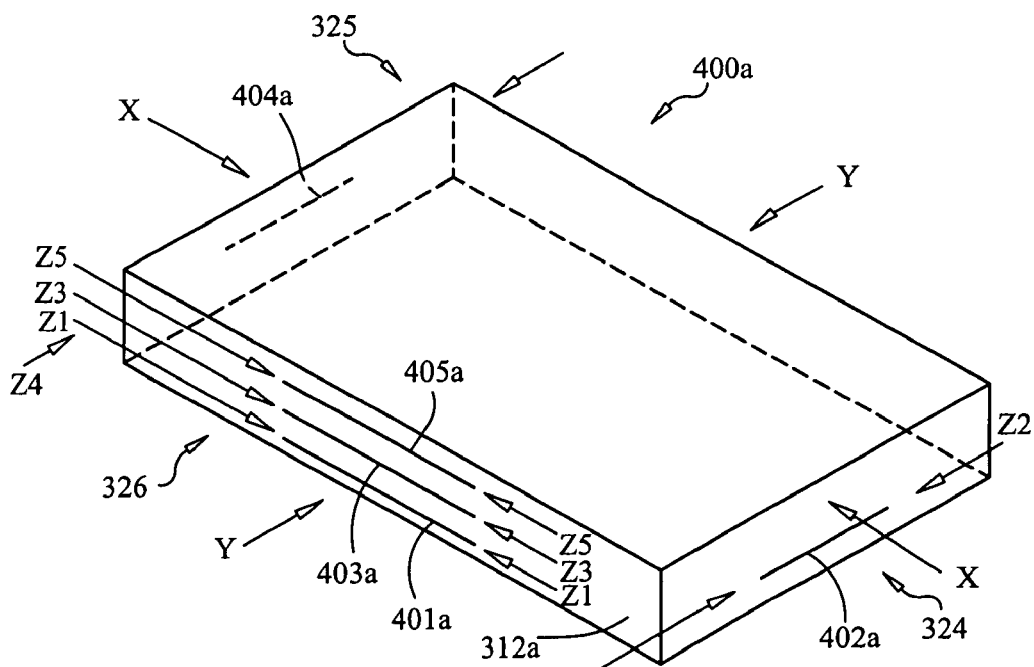
FIG. 4*a* is a perspective view of part of a first device structure of the type tested using the circuit of FIG. 1 and for which insertion loss is shown in FIG. 2 as curve 210, and wherein edge interconnection structure and/or electrode terminal is removed to show portions of electrode plates that electrically contact to the edge interconnection structure and/or electrode terminal.

FIG. 4a shows structure 400a which has the external configuration of structure 300 of FIG. 3. However, edge interconnection structure is not included in FIG. 4a such that surfaces of FIG. 3 underneath edge interconnection structure form the external surfaces of structure 400a. FIG. 4a and subsequent figures show a side or side surface 324 corresponding to side surface 324 of FIG. 3 in order to orient views relative to external surfaces shown in FIG. 3, and sometimes show surfaces numbered 325-329 corresponding in orientation of structure to side surfaces 325–329 of FIG. 3.

FIG. 4a shows in stacking sequence of electrode plates. The sequence is as follows: lower shielding electrode plate 401a, first electrode plate 402a, central shield plate 403a, second electrode plate 404a, and upper shielding electrode plate 405a. First electrode plate 402a has an edge exposed on side 324 of structure 400a and on no other side. Second electrode plate 404a has an edge exposed on the side 325 (corresponding to side surface 325 of structure 300) opposite side 324 of structure 400a and on no other side. Shielding electrode plates 401a, 403a, and 405a have edges exposed on sides of structure 400a corresponding to front and back surfaces 326, 327 of structure 300 and on no other side.

Figure 4B:
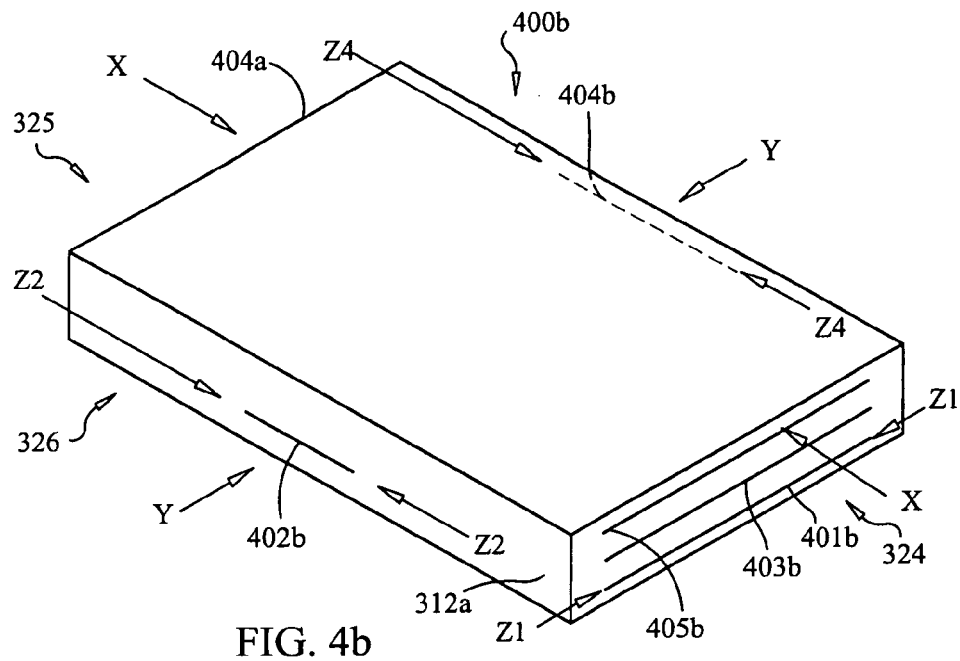
FIG. 4*b* is a perspective view of part of a second device structure 400*a* of the type tested using the circuit of FIG. 1 and for which insertion loss is shown in FIG. 2 as curve 220, and wherein the edge interconnection structure and/or electrode terminal is removed to show portions of electrode plates that electrically contact to the edge interconnection structure and/or electrode terminal. Structure 400*a* is a first embodiment of the invention.

FIG. 4b shows structure 400b having a stacking sequence of electrode plates. The sequence is the same as for structure 400a shown in FIG. 4a, which is as follows: lower shielding electrode plate 401b, first electrode plate 402b, central shield plate 403b, second electrode plate 404b, and upper shielding electrode plate 405b.

FIG. 4 shows electrically insulating surface portion 312a between the edges of shielding electrode plates 401b, 403b, 405b and side face 324.

In contrast with structure 400a, first electrode plate 402b of structure 400b has an edge exposed on front side 326 of structure 400b and on no other side. Second electrode plate 404b has an edge exposed on the back side 327 of structure 400b and on no other side. Shielding electrode plates 401a, 403a, and 405a have edges exposed on sides of structure 400b corresponding to side surfaces 324, 325, and on no other side.

Figure 5:
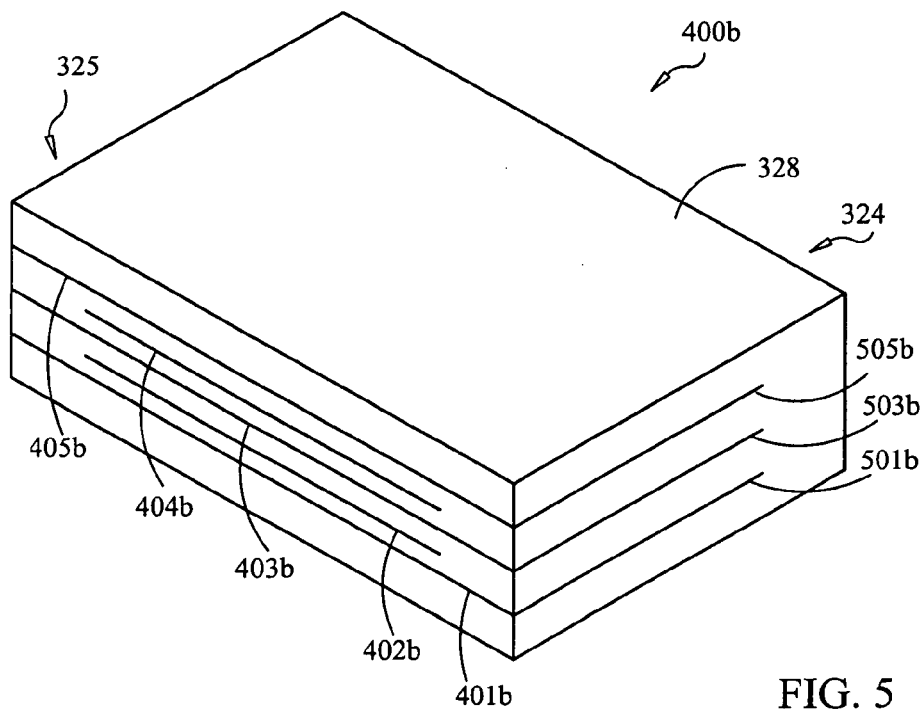
FIG. 5. is a perspective sectional view along the line X—X in FIG. 4*b* showing arrangement of electrode plates 401*b*–405*b*.

FIG. 5. shows structure 400b's electrodes' plate stack sequence for electrode plates 401b–405b along the X—X cut in FIG. 4b. Shielding electrode plates 401b, 403b, and 405b extend an entire length from side 324 to side 325. Shielding electrode plates 401b, 403b, and 504b include electrode shield plate edges 501b, 503b, 505b, respectively, in side surface 324, and corresponding edges in opposite side surface 325. First and second electrode plates 402b, 404b do not include plate edges in side surfaces 324, 325.

Figure 6:
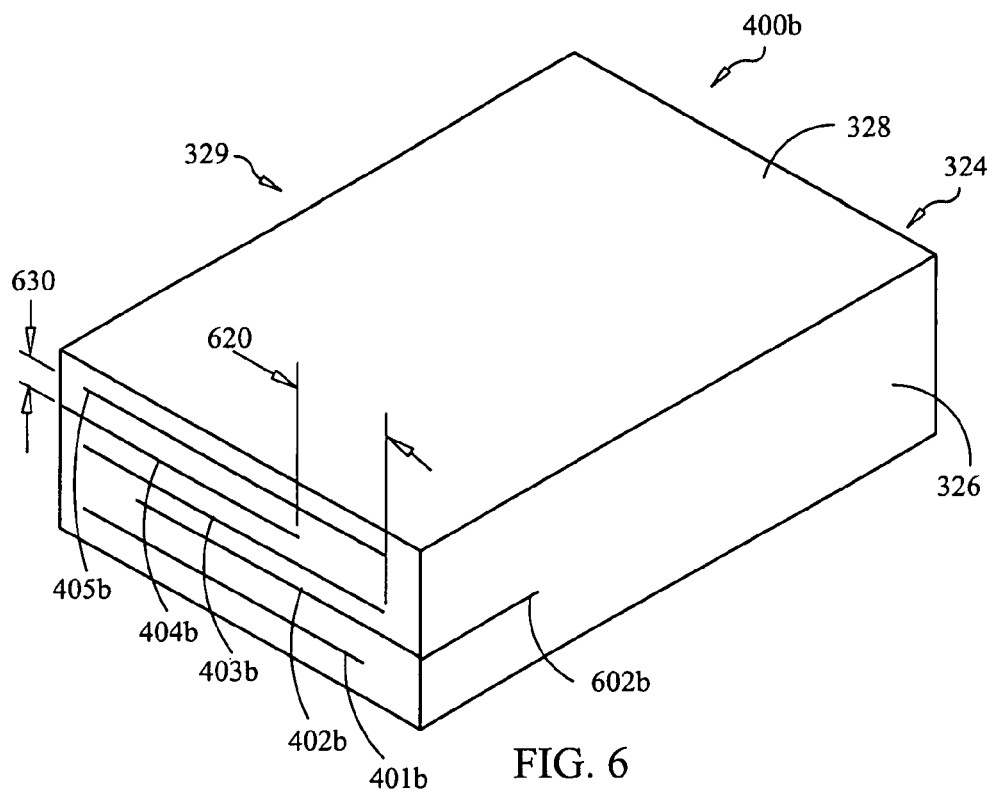
FIG. 6 is a perspective sectional view along the line Y—Y in FIG. 4*b* showing arrangement of electrode plates 401*b*–405*b*.

FIG. 6 shows structure 400b's electrodes' plate stack sequence for electrode plates 401b–405b along the Y—Y cut in FIG. 4b. Shielding electrode plates 401b, 403b, 405b do not extend to front surface 326 or back surface 329. First electrode plate 402b has an edge 602b in front surface 326, and does not extend to back surface 329 or side surfaces 324, 325. Second electrode plate 404b has an edge (not shown) in back surface 329 and does not extend to front surface 326 or side surfaces 324, 325. FIG. 6 shows distance 620 from an edge of shielding electrode plate 405b proximal front side 326 to an edge of second electrode plate 404b proximal front side 326. FIG. 6 shows a distance 630 between second electrode plate 404b and shielding electrode plate 405b.

Figure 7:
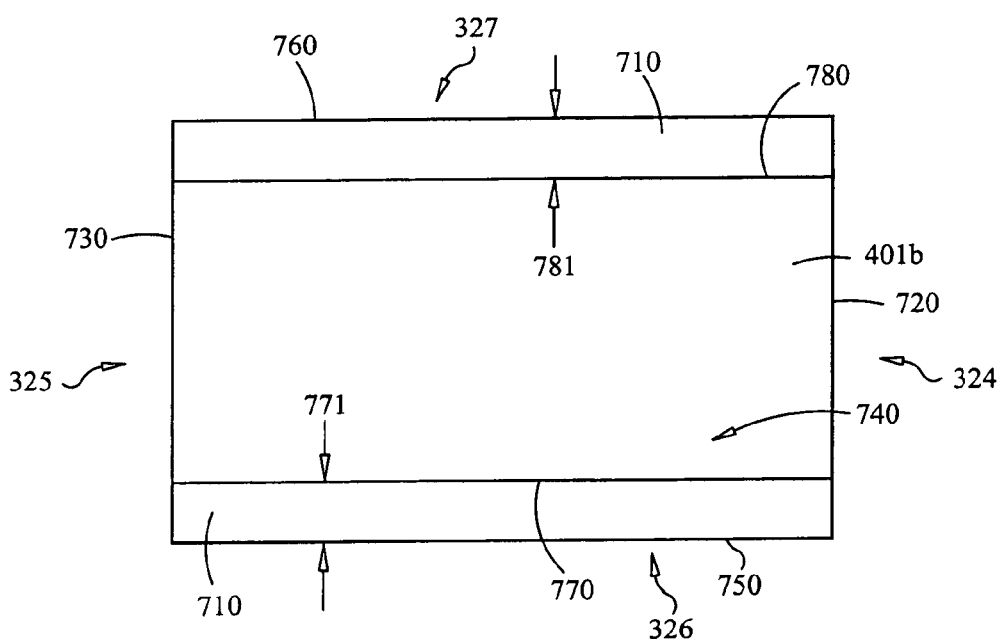
FIG. 7 is a top sectional view along the line Z1—Z1 in FIG. 4*b*, i.e., exposing on a top surface the lowest one of the three shielding electrode plates 401*b* and surrounding material.

FIG. 7 shows lower shielding electrode plate 401b and surrounding dielectric material 710. Lower shielding electrode plate 401b has shielding electrode plate side edges 720, 730 in side surfaces 324, 325. Lower shielding electrode plate 401b defines generally rectangular top major surface 740. Lower shielding electrode plate 401b does not extend to front surface 326 or back surface 327. Lower shielding electrode plate 401b has lower shielding electrode plate front edge 770 recessed from front surface 326 by lower shielding electrode front edge distance 771. Lower shielding electrode plate 401b has lower shielding electrode plate back edge 780 recessed from back surface 327 by lower shielding electrode back edge distance 781. Surrounding dielectric material 710 defines surface 750 forming part of front surface 326 and another surface 760 forming part of side back surface 327.

Shielding electrode plates 403b, 405b have the same general structure as shielding electrode plate 401b.

Figure 8:
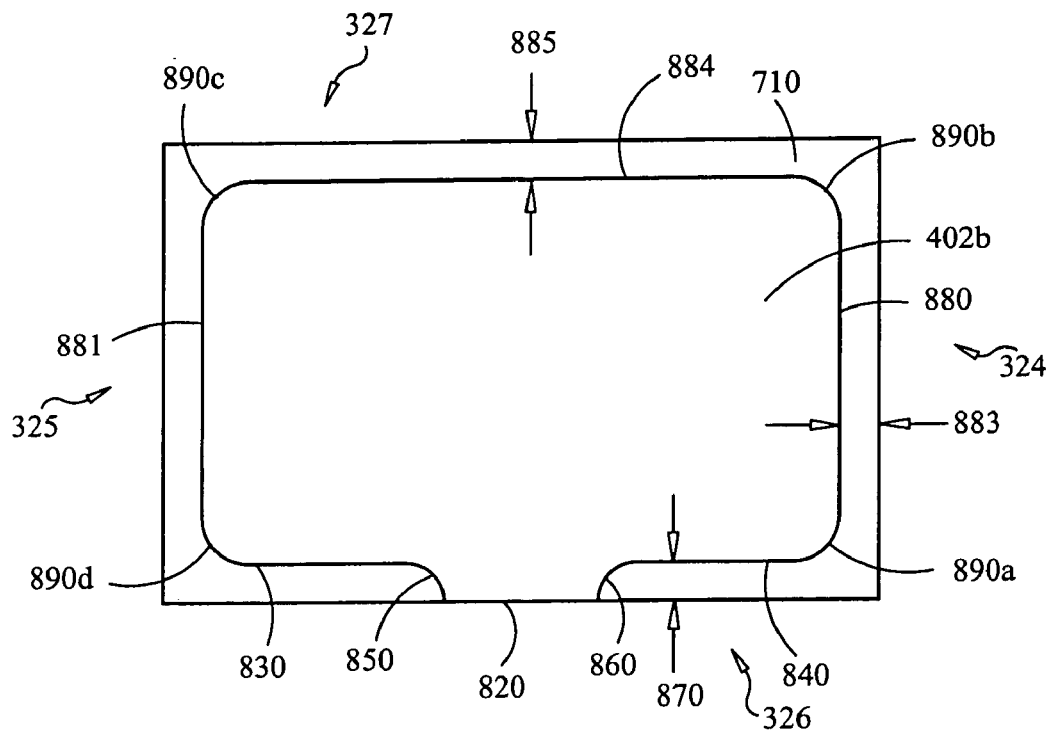
FIG. 8 is a top sectional view along the line Z2—Z2 in FIG. 4*b*, i.e., exposing a top surface of lower non-shielding electrode plate 402*b* and surrounding material.

FIG. 8 shows lower electrode plate 402b and surrounding dielectric material 710. Lower first electrode plate 402b has lower first electrode plate front edge 820, lower first electrode plate front edges 830, 840, and lower first electrode plate edge transition regions 850, 860. Front edge 820 does not extend to side surfaces 324, 325. Lower first electrode plate front edges 820, 830, 840 intersect edge transition regions 850, 860. Edge transition regions 850, 860, transition the front facing edges of lower first electrode plate 402b from front edge 820 in the front surface 326 into front edges 830, 840. Front edges 830, 840 are recessed from the front surface 326 by front edge recess distance 870.

Lower first electrode plate 402b defines lower first electrode plate side edges 880, 881, which are recessed from side surfaces 324, 325 by lower first electrode plate side recess distance 883. Lower first electrode plate back edge 884 is recessed from back surface 327 by lower first electrode plate back recess distance 885.

Lower first electrode plate 402b defines lower first electrode plate corner edge recessed transitions 890a, 890b, 890c, 890d. Edge recess transitions 890a, 890b, 890c, 890d do not form 90 degree angles. Instead, they define a finite radius of curvature on the order of a fraction of the length or width dimension of structure 400b.

Figure 9:
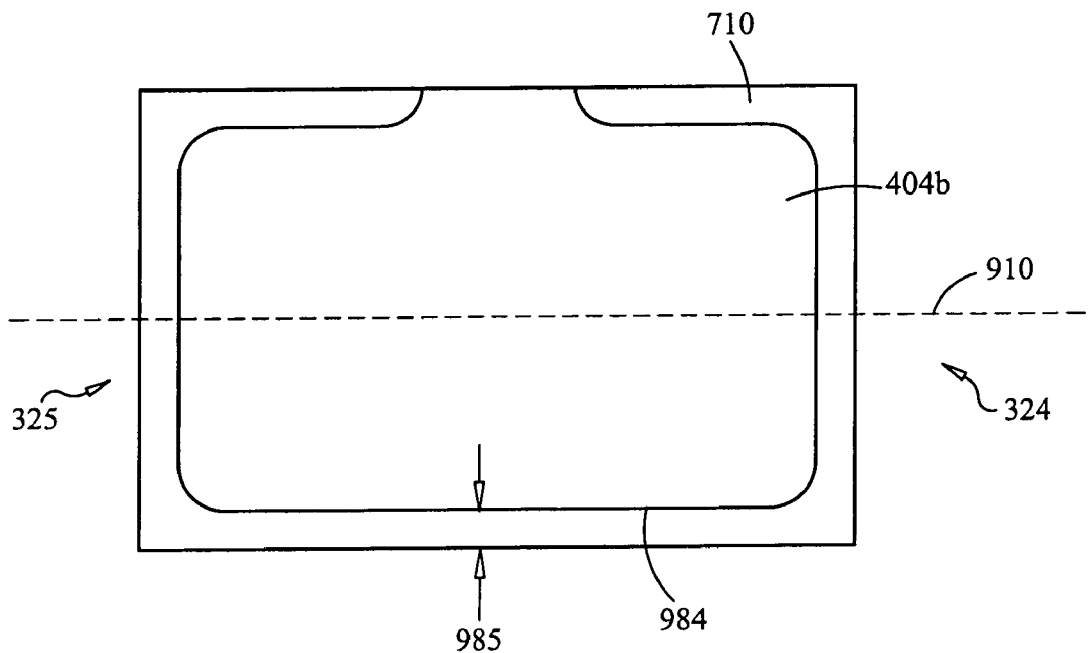
FIG. 9 is a top sectional view along the line Z4—Z4 in FIG. 4*b*, i.e., exposing a top surface of upper non-shielding electrode plate 404*b* and surrounding material.

FIG. 9 shows upper second electrode plate 404b and surrounding dielectric material 710. FIG. 9 also shows a center line 910 halfway along side surfaces 324, 325. Upper plate 404b is a mirror image about center line 910 of lower plate 402b. Upper plate front edge 984 is recessed from front surface 327 by upper plate front recess distance 985.

Figure 10:
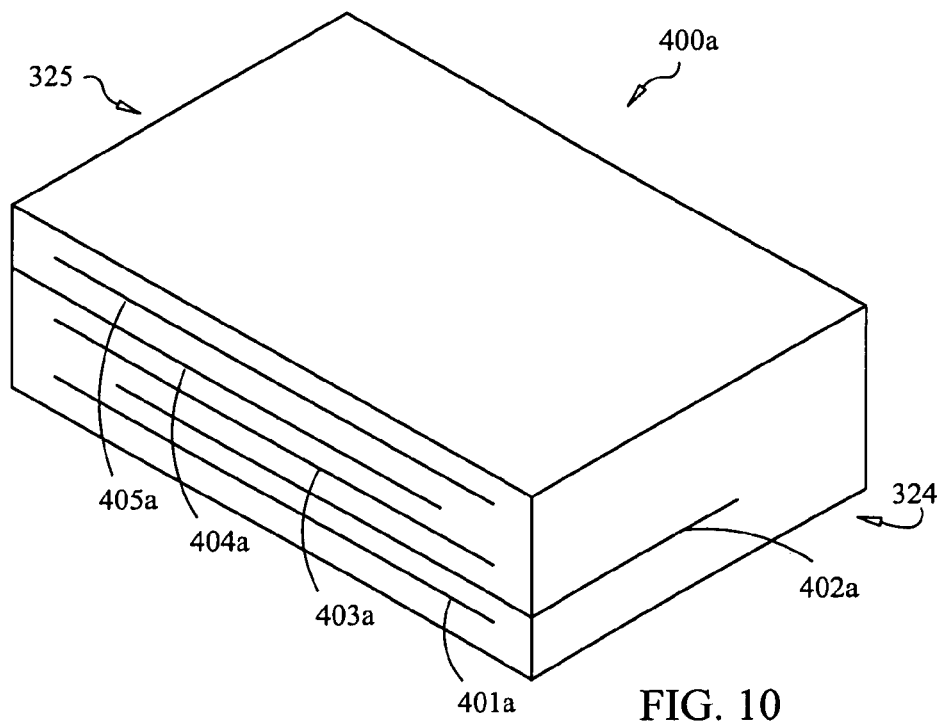
FIG. 10 is a perspective sectional view along the line X—X in FIG. 4*a* showing arrangement of electrode plates 401*a*–405*a*.

FIG. 10 shows structure 400a's electrodes' plate stack sequence for electrode plates 401a–405a along the X—X cut in FIG. 4a. Shielding electrode plates 401a, 403a, and 405a do not extend to side surfaces 324, 325. Shielding electrode plates 401a, 403a, and 405a do extend a substantial fraction of the distance from side surfaces 324 to side surface 325. Electrode plates 402a, 404b do not include electrode plate edges in side surfaces 324, 325. At the X—X plane, shielding electrode plates 401a, 403a, 405a are centered between side surfaces 324, 325. Lower first electrode plate 402a has an edge in side surface 324. Upper second electrode plate 404a has an edge in the hidden side surface 325.

Figure 11:
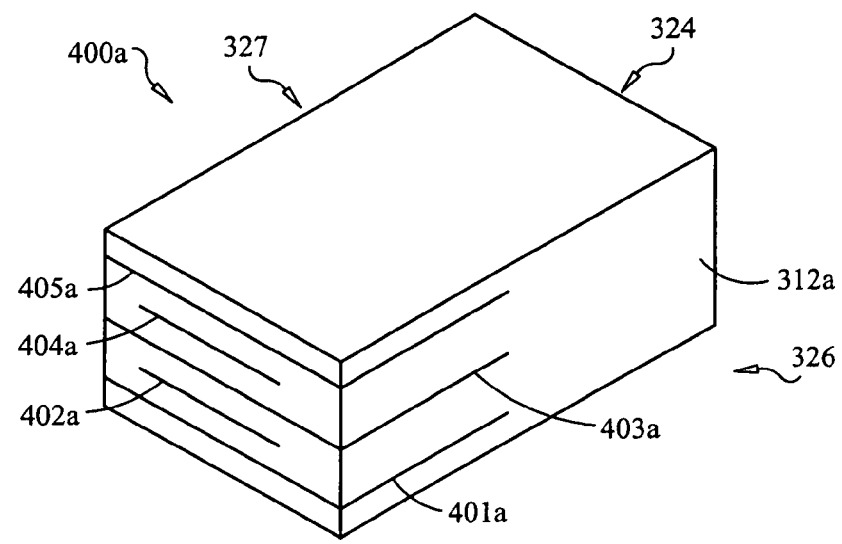
FIG. 11 is a perspective sectional view along the line Y—Y in FIG. 4*a* showing the arrangement of electrode plates 401*a*–405*a*.

FIG. 11 shows structure 400a's electrodes' plate stack sequence for electrode plates 401a–405a along the Y—Y cut in FIG. 4a. At the Y—Y plane, shielding plate electrodes 401a, 403a, 405a extend to side front and back surfaces 326, 327 such that they each have an edge in front surface 326 and back surface 327. First and second electrode plates 402a, 404a do not extend to front or back surfaces 326, 327.

Figure 12:
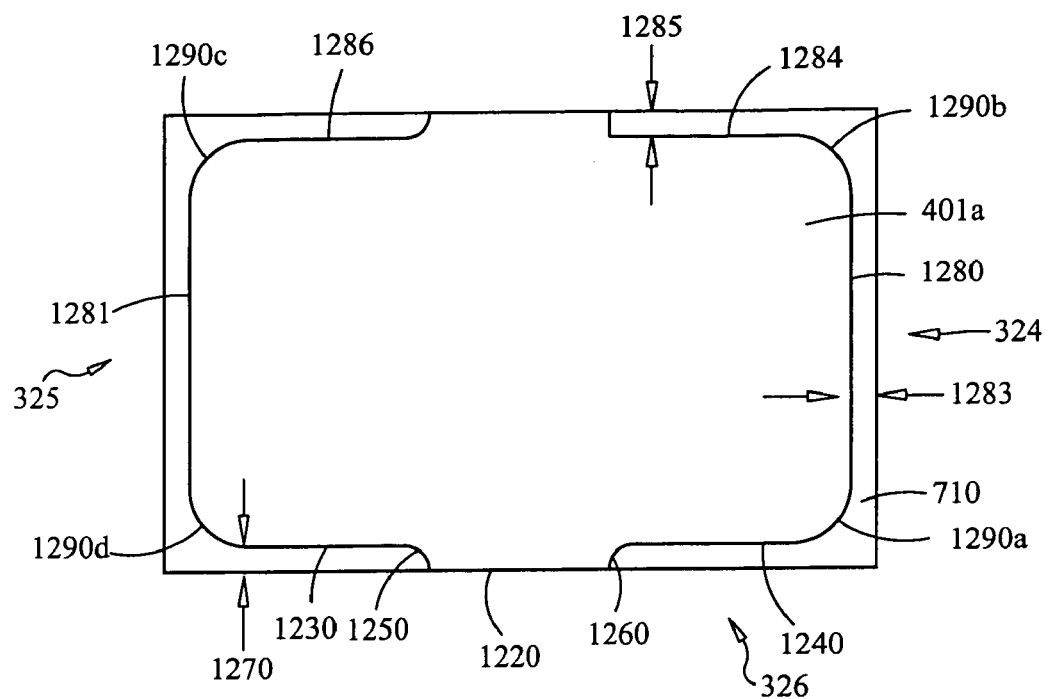
FIG. 12 is a top sectional view along the line Z1—Z1 in FIG. 4*a*., i.e., exposing a top surface of the lower shielding electrode layer 401*a* and surrounding material.

FIG. 12 shows lower shielding electrode plate 401a and surrounding dielectric material 710. Lower shielding electrode plate 401a has lower shielding electrode plate front edge 1220, lower shielding electrode plate front edges 1230, 1240, and lower shielding electrode plate front edge transition regions 1250, 1260. Front edge 1220 does not extend to side surfaces 324, 325. Lower electrode plate front edges 1220, 1230, 1240 intersect front edge transition regions 1250, 1260. Front edge transition regions 1250, 1260, transition the front facing edge of lower shielding electrode plate 401a from front edge 1220 in the front surface 326 into front edges 1230, 1240, respectively, which are recessed from the front surface 326 by front edge recess distance 1270.

Lower shielding electrode plate 401b defines lower shielding electrode plate side edges 1280, 1281, which are recessed from side surfaces 324, 325 by lower electrode plate side recess distance 1283. Lower shielding electrode plate back edges 1284, 1286, are recessed from back surface 327 by lower shielding electrode plate back recess distance 1285.

Lower first electrode plate 401a defines lower first electrode plate corner edge recessed transitions 1290a, 1290b, 1290c, 1290d. Edge recess transitions 1290a, 1290b, 1290c, 1290d do not form right angles. Instead, they define a finite radius of curvature on the order of a fraction of the length or width dimension of structure 400a.

Shielding electrode plates 403a, 405a have the same general shape as lower shielding electrode plate 401a.

Figure 13:
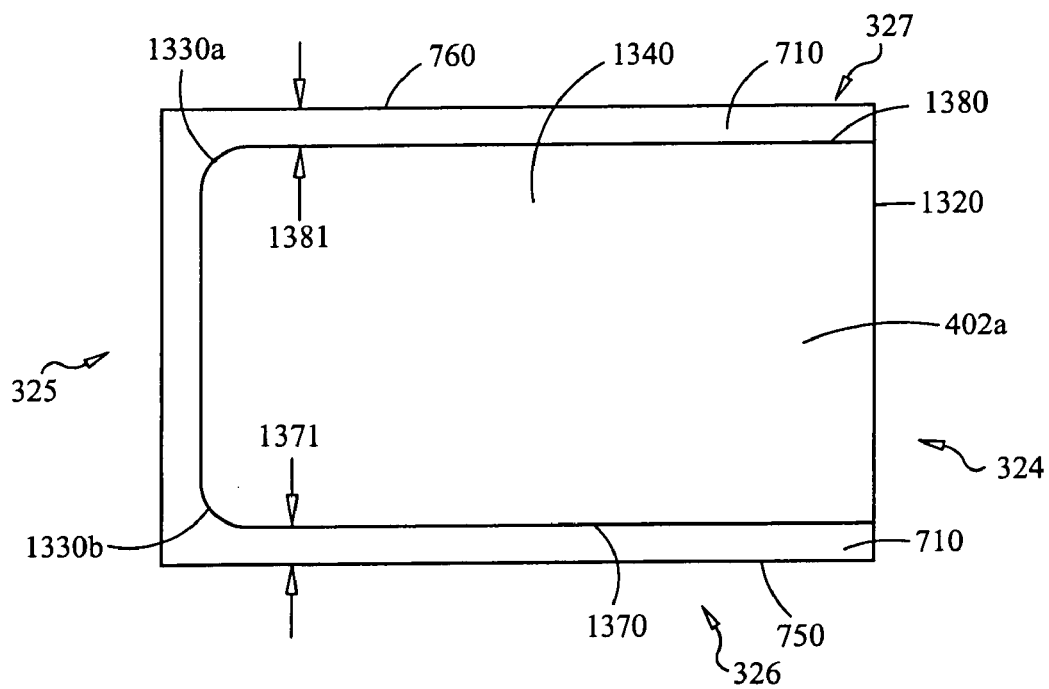
FIG. 13 is a top sectional view along the line Z2—Z2 in FIG. 4*a*., i.e., exposing a top surface of the lower non-shielding electrode layer 402*a* and surrounding material.

FIG. 13 shows lower first electrode plate 402a and surrounding dielectric material 710. Lower first electrode plate 402a defines lower first electrode plate side edge 1320 in side surface 324. Lower first electrode plate 402a defines generally rectangular top major surface 1340. However, lower first electrode plate 402a defines lower first electrode plate side edges 1330a, 1330b, adjacent side surface 325 that are not right angles and that have radii of curvature less than the length or width of structure 400a. Lower first electrode plate 402a does not extend to front surface 326 or back surface 327. Surrounding dielectric material 710 defines surface 750 forming part of front surface 326 and surface 760 forming part of side back surface 327. Lower first electrode plate 402a defines lower first electrode plate front edge 1370 recessed from front surface 326 by lower first electrode plate front edge recess distance 1371. Lower first electrode plate 402a defines lower first electrode plate back edge 1380 recessed from back surface 327 by lower first electrode plate back edge recess distance 1381.

Figure 14:
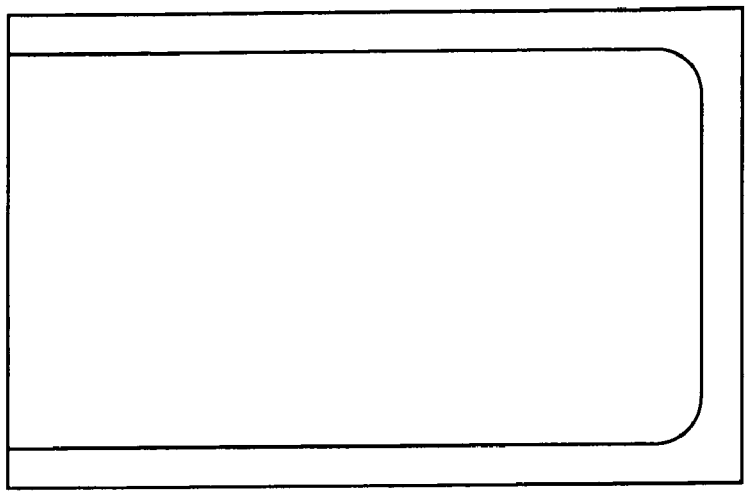
FIG. 14 is a top sectional view along the line Z4—Z4 in FIG. 4*a*., i.e., exposing a top surface of the upper non-shielding electrode layer 404*a* and surrounding material.

FIG. 14 shows upper second electrode plate 404a and surrounding dielectric material 710. Upper second electrode plate 404a is generally a mirror image of lower first electrode plate 402a mirrored along an imaginary vertical line of symmetry passing through the center of electrode 402a as shown in FIG. 13.

FIG. 4b and FIGS. 5–9 illustrate structures of layers and a sequence of layers of one embodiment of the invention having the external structure shown in FIG. 3. This embodiment shows only a minimum sequence of plates of the shielding electrode, first electrode, and second electrode including one plate of a first electrode and one plate of a second electrode. The first and second electrodes may each include multiple electrode plates. Preferably, the first electrode has the same number of plates as the second electrode. Preferably, the number of plates of the shielding electrode that are spaced between a plate of the first electrode and a plate of the second electrode (i.e., excluding the plates of the shielding electrode external to the plates of the first and second electrodes) is equal to or greater than the sum of the number of electrode plates of the first electrode plus the number of electrode plates of the second electrode, minus 1.

Figure 15:
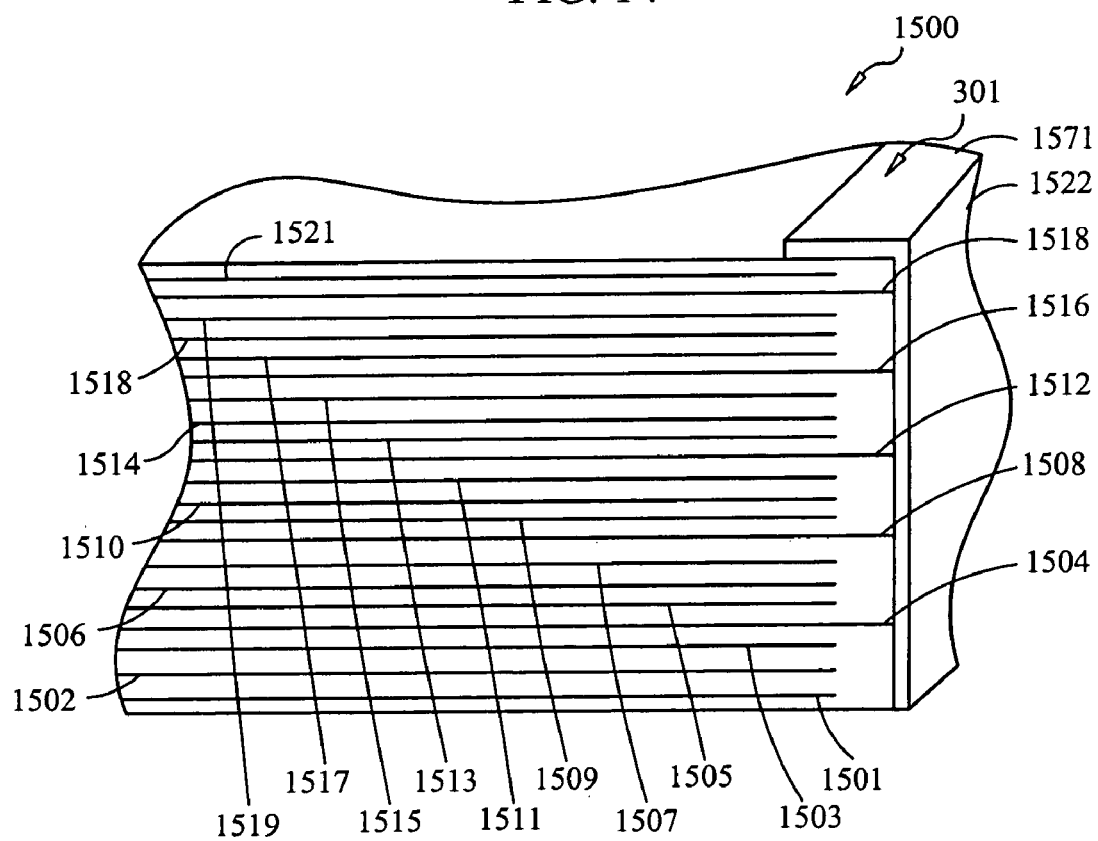
FIG. 15 is a perspective partial sectional view showing portions of eleven shield plates of a shielding electrode, five plates of a first electrode, and five plates of a second electrode, and an electrode interconnection structure of a structure 1500 of a second embodiment of the invention.

FIG. 15 illustrates a second embodiment of the invention including more than one plate forming each one of the first electrode and the second electrode.

FIG. 15 illustrates another novel device structure 1500 having the outer surface structure shown in FIG. 3. Structure 1500 includes shielding electrode bottom plate 1501; shielding electrode middle plates 1503, 1505, 1507, 1509, 1511, 1513, 1515, 1517, 1519; shielding electrode top plate 1521; first electrode lower plate 1502; first electrode middle plates 1506, 1510, 1514; first electrode upper plate 1518; second electrode lower plate 1504; second electrode plates 1504, 1508, 1512, 1516; and second electrode upper plate 1518. Structure 1500 also includes edge interconnection structure in the form of side electrode terminal 301 defining side electrode terminal conductive portion 1571 in top surface 328 and side electrode terminal side portion 1522 in side surface 324.

Structure 1500 includes 11 shield plates for the shielding electrode and 5 plates for each of first and second electrodes. Each plate of the first electrode is separated a plate of the second electrode by a plate of the shielding electrode. In addition, there is a plate of the shielding electrode external to all plates of the first and second electrodes at the top of the structure and another plate of the shielding electrode external to all plates of the first and second electrodes at the bottom of structure.

Structure 1500 shows an equal number of plates of the first electrode and the second electrode, which is preferred, because it provides improved signal conditioning. However, when structures like structure 1500 include a large enough number of plates in the first and second electrodes, a slight difference in number of plates in the first and second electrodes will not significantly impact signal conditioning ability.

Accordingly, preferably for all embodiments, the difference between the number of plates of the first electrode and the number of plates of the second is less than one percent of the number of plates of either electrode.

FIGS. 16a–d relate to structures that incorporate electrically conductive paths passing through apertures in plates of one or more electrodes in order to electrically connect plates of one electrode to one another and/or electrically conductive paths not passing through apertures in plates of one or more electrodes in order to electrically connect plates of a shielding electrode to one another and define a cage including shielding electrode plates and electrically conductive paths around all plates of the first and second electrodes. Electrically conductive paths passing through apertures in plates of one or more electrodes can be incorporated in discrete, PC board, and IC embodiments of this invention.

Figure 16A:
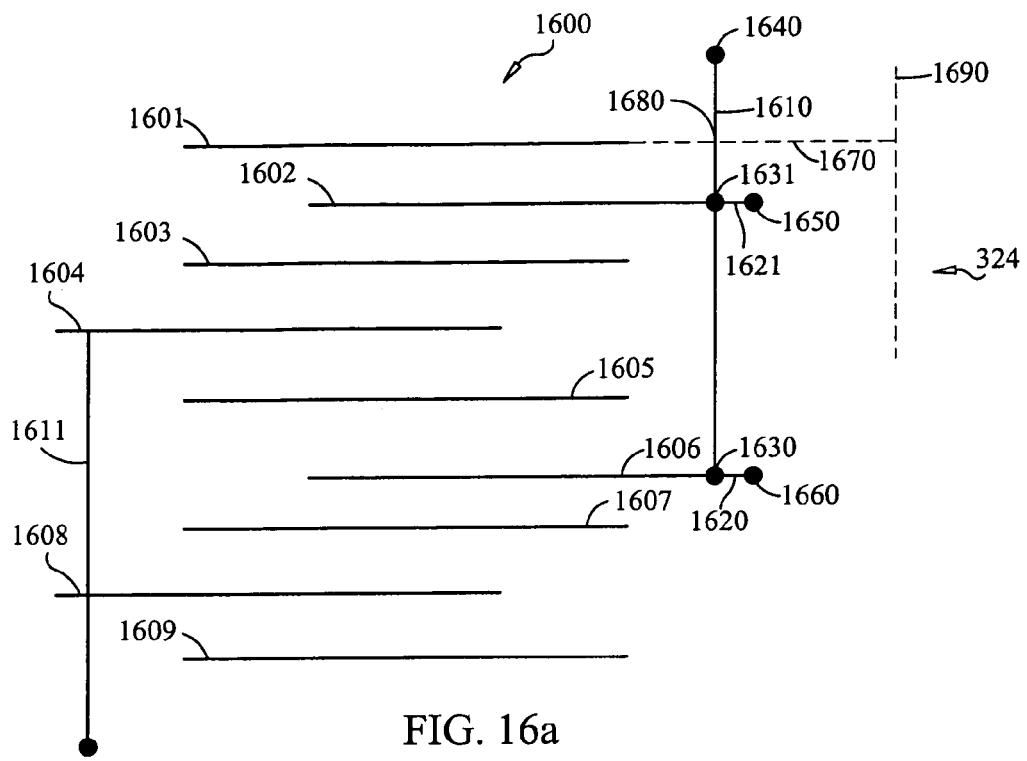
FIG. 16*a* is a partial section and schematic view at a plane intersecting a conductive wire line electrically connecting plates of a first electrode to one another and conductive wire line electrically connecting plates of a second electrode to one another of structure 1600 of third through fifth embodiments of the invention.

FIG. 16a shows a cross section of structure 1600 including upper shielding electrode plate 1601; shielding electrode plates 1603, 1605, 1607; lower shielding electrode plate 1609; first electrode plates 1602, 1606; second electrode plates 1604, 1608; first electrode conductive wire line 1610, second electrode conductive wire line 1611, first electrode plate extensions 1620, 1621; first electrode plate-wire line intersections 1630, 1631; and first electrode wire line termination point 1640.

In structure 1600 each plate of the first electrode is separated from a plate of the second electrode by a plate of the shielding electrode, and the shielding electrode includes at least one plate above all plates of the first and second electrodes and one at least one plate below all plates of the first and second electrodes.

Wire line 1610 electrically connects to plate 1602 at plate-wire line intersection 1631, and electrically connects to plate 1606 at plate-wire line intersection 1630. Wire line 1611 includes plate-wire interconnections that electrically connect plates 1604 and 1608 to one another. First electrode plate 1602 may include first electrode plate extension 1621.

A plate overlap region means a region in which major surfaces of two plates overlap.

First electrode plate extension 1621 of plate 1602 extends from a plate overlap region of plate 1602 with one other plate in structure 1600 to a side of wire line 1610 opposite the side on which the one other plate entirely resides. The one other plate could be any one of plates 1601, and 1603–1609. First electrode plate 1606 may include plate extension 1620. Each one of second electrode plates 1604, 1608, may include a plate extension, as shown but not numbered.

Wire line 1610's extension in the vertical direction as shown in FIG. 16a terminates at termination point 1640. Termination point 1640 may be connected to a signal line or a return line.

First electrode plate extension 1621, if it exists, terminates in first electrode plate extension termination 1650. Termination 1650 is shown as a point in a cross-section. In a plan view of plate 1602, termination 1650 is defined by an edge of plate 1602. That edge may be generally straight, may have rounded edges defining radii of curvature less than the width of plate 1602, or may define a necked structure having the general shape shown for the necked structure defined by transitions 850, 860 and edge 820 of the front side edge of plate 402b in FIG. 8.

In a fourth alternative embodiment indicated by dashed line 1670, at least one of and preferably all of the shield electrode plates have a shield electrode plate extension, like shielding electrode plate extension 1670 of shielding electrode plate 1601, indicated by the dashed line in FIG. 16a, that extends away from the region of overlapped plates and/or the region between wire lines 1610, 1611 beyond wire line 1640, preferably also extends beyond the extension of at least one of the extension regions 1620, 1621 of the plates of the first electrode, and preferably extends beyond the extension of all of the extension regions of the first and second electrodes. In this fourth embodiment, plate 1601 includes aperture 1680 in which a section of wire line 1610 resides. Aperture 1680 is large enough to prevents electrical contact of wire line 1610 to shielding electrode plate 1601.

In another and fifth alternative embodiment relating to FIG. 16a, conductive wire line 1690, indicated by a dashed line in FIG. 16a, intersects with and electrically connects to shielding electrode plate extension 1670. Preferably, conductive wire line 1690 also connects to all of the other plates of the shielding electrode, which plates also have shielding electrode plate extensions along the path of wire line 1690.

Figure 16B:
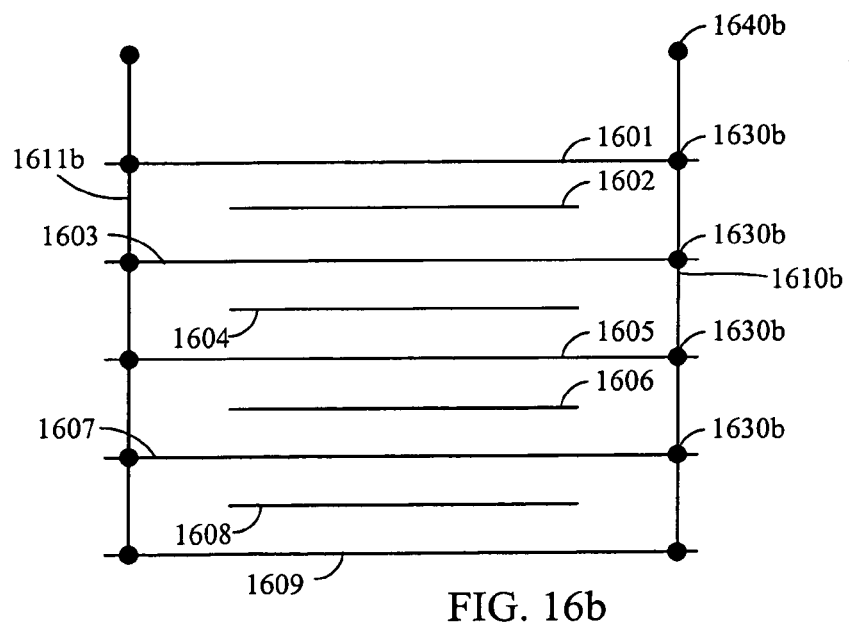
FIG. 16*b* is a partial section and schematic view in a plane intersecting conductive wire lines electrically connecting plates of the shielding electrode to one another of structure 1600.

FIG. 16b shows a section of structure 1600 in a plane showing wire lines connecting plates of the shielding electrodes. This plate is generally non-parallel, such as generally perpendicular, to the plane of the cut shown in FIG. 16a. Shielding electrode wire lines 1610b, 1611b intersect with and electrically connect shielding electrode plates 1601, 1603, 1605, 1607 to one another. Wire line 1610b terminates at termination 1640b and intersects shielding electrode plates at shielding plate-wire intersections 1630b.

Wire lines 1610b, 1611b exist beyond the extension of plates 1602, 1604, 1606, 1608 for all electrodes other than the shielding electrode.

Figure 16C:
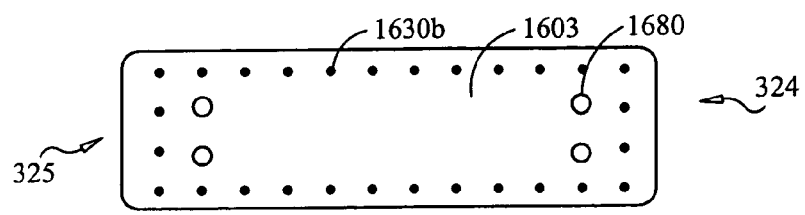
FIG. 16*c* is a plan view showing a surface of a plate of the shielding electrode showing locations of intersection with the conductive wire lines and optional apertures of structure 1600.

FIG. 16c shows, in a plan view, a surface of plate 1603 of the shielding electrode of structure 1600. Shielding plate-wire intersections 1603b, which are represented by dots in FIG. 16c, are locations where wire lines extending out of the page of FIG. 16c and intersect with and electrically connect to plate 1603. Shielding plate-wire intersections 1630b, are distributed along a closed path near the periphery of plate 1603. Apertures 1680 are distribute at opposite sides 324, 325, of plate 1603.

Figure 16D:
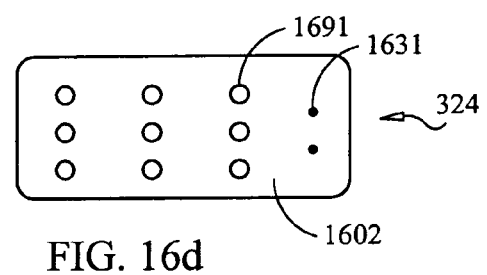
FIG. 16*d* is a plan view showing a surface of a plate of a non-shielding electrode showing intersections with conductive wire lines and optional apertures of structure 1600.

FIG. 16d shows, in plan view, electrode plate 1602. Other plates of the non-shielding electrode have corresponding structure.

In a six alternative embodiment, plate 1602 includes one or more apertures 1691 away from the periphery of electrode plate 1602. In the sixth embodiment, non-peripheral wire lines extend through apertures 1602 such that the non-peripheral wire lines do not electrically connect to electrode plate 1602, and each such non-peripheral wire does electrically connect to at least on other plate in structure 1600. For example, non-peripheral wire lines may connect all plates of one electrode to one another, may connect all plates of each non-shielding electrode to one another, or may connect all plates of the shielding electrode to one another.

Figure 17:
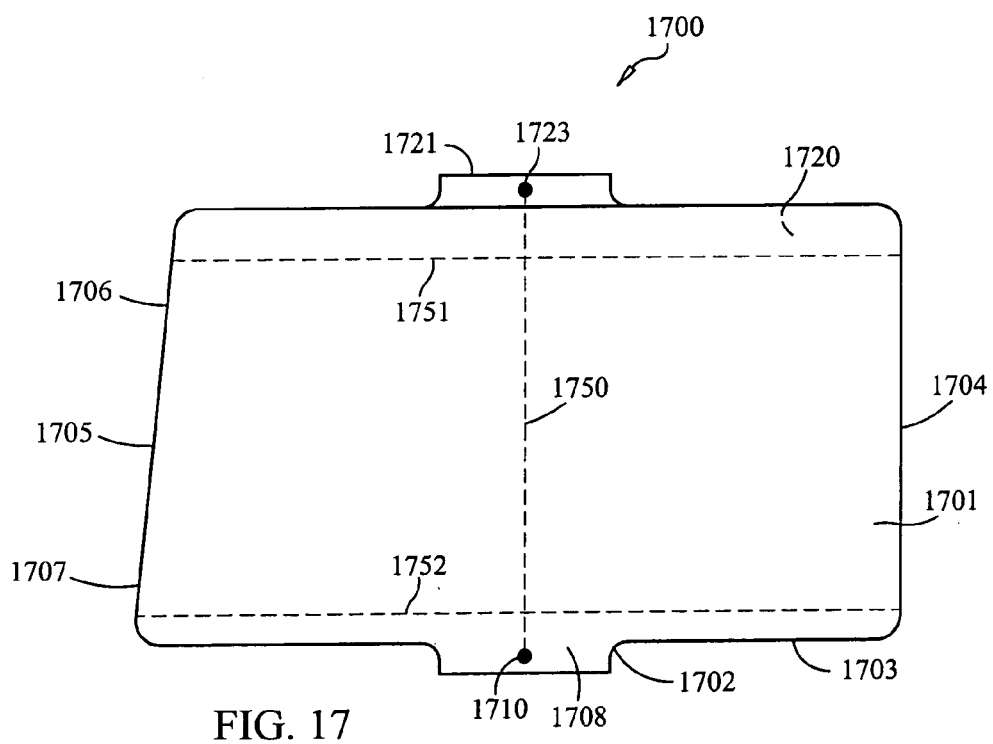
FIG. 17 is a plan view generally showing two electrodes plates and examples of an energy pathway line segment and two energy perpendicular line segments including the maximal energy perpendicular line segment.

FIG. 17 shows in plan view visible sections of a stack consisting of first electrode plate 1701 and second electrode plate 1720 for purposes of illustrating examples of energy pathway line segments and energy perpendicular line segments.

FIG. 17 shows plate stack 1700 including top plate 1701 and bottom plate 1720. Top plate 1701 includes necked portion 1708. Bottom plate 1720 includes necked portion 1721. Necked portions 1708, 1721 correspond to necked portions discussed herein above which electrically connect plates of electrodes to edge inter connection structure. Plate stack 1700 includes right side surface 1704, left side surface 1705, and left side portions 1706, 1707. Points 1710, 1723 represent the location geometric center of necked portions 1708, 1721.

Line segment 1750 extends between points 1723, 1710, and line segment 1750. Line segment 1750 is the energy pathway line segment.

Line segment 1751 extends from right side 1704 to region 1707 of left side 1705, and line segment 1751 is generally perpendicular to line segment 1750. Line segment 1751 represents an energy perpendicular line segment.

Line segment 1752 extends from right side 1704 to region 1707 of left side 1705, and it is perpendicular to line segment 1750. Line segment 1752 intersects dashed line segment 1750 at a location resulting in the longest energy perpendicular line segment, and it is the maximal energy perpendicular line segment. Line segment 1752 is longer than line segment 1751 because left side edge region 1707 is further than left side edge region 1706 from right side edge 1704.

Alternative Embodiments

FIG. 1 depicts a test circuit. Circuits including a structure of the invention typically include a source of electrical power providing current, voltage, or power, a load to which electrical power from the source of electrical power is supplied, and a structure of the invention like novel Device B in which (1) a first electrode of the structure is electrically connected to the source or to a conductive path electrically connected to the source, a second electrode is electrically connected to the return or to a conductive path electrically connected to the return, and a shielding electrode is electrically connected to a ground (or source or sink of charge). In some embodiments, the source or sink of charge to which the shielding electrode is electrically connected is a chassis ground. The conductive paths may be wires, coaxial cables, strip line, coplanar, waveguide, or any other type of conductive pathway used from zero to very high frequencies to transmit electrical energy.

FIG. 2 shows that the insertion loss of Device B exceeds that of Device A over a 100 megahertz range. The inventors recognize that the frequency range over which insertion loss of a structure of the invention exceeds a comparably dimensioned and externally shaped structure of a prior art device, various configurations of the invention may provide a different range in which the insertion loss exceeds the insertion loss of a corresponding prior art device, such as 1—1 mega Hertz, 0–10 mega Hertz, 0–1000 mega Hertz, 0–10000 mega Hertz, and that the absolute value of the insertion loss of these various devices of invention may range from greater than −40 dB, −50 dB, −60 dB, −70 dB, −80 dB, −90 dB, −100 dB, −110 dB, and −120 dB, depending upon frequency, dimensions of the structure of the invention, circuit configuration of the conductive structure electrically connected to the shielding electrode, and composition of the materials forming the structure of the invention.

FIG. 3 shows external dimensions of structure 300 and its edge interconnection structure in which each portion of the side electrode terminals 301, 305, front electrode terminal 306, back electrode terminal 310 forming part of each side of structure 300 is rectangular. Alternatively, any of these portions of the side, front, and back electrode terminals could have edges that are irregularly shaped, concave, convex, tapered, rounded, or with edges rounded. Moreover, the edge interconnection structure may be formed from different conductive material than plates of wire lines in the structure. For example, at least some of the edge interconnection structure may be formed from higher cost higher conductivity materials, such as substantially pure gold, platinum, palladium, or iridium, and at least some of the conductive material internal to the structure may be formed substantially from nickel or copper.

The center of front electrode terminal 306 may reside closer to side surface 324 than side surface 325 or vice versa. The center of back electrode terminal 310 may reside closer to side surface 324 than side surface 325 or vice versa.

Preferably, front electrode terminal 306 covers front edge 820 of first electrode plate 402*b*. Preferably, back electrode terminal 310 covers the back edge of upper plate 404*b* that corresponds in shape to front edge 820. Thus, if the front electrode terminal of the back electrode terminal is offset towards one side, preferably the corresponding edges of the electrode plates of the non-shielding electrodes are also offset towards that side so that they each remain covered by an electrode terminal.

Side electrode terminals 301 and 305 may include electrically conductive material extending between front electrode terminal 306 and back electrode terminal 310 thereby electrically connecting side electrode terminals 301, 305 to one another to form a single external electrode terminal connecting to the plates of the shielding electrode.

Dielectric material may cover some parts of electrode terminals 301, 305, 306, 310.

Portions of side electrode terminal 301, side electrode 305, or structure electrically connecting those two terminals to one another, may overlap portions of one or both of front and back electrodes 306, 310, and be electrically insulated therefrom by a dielectric material.

Back electrode terminal side to side width 320 may be less than 95 percent of the side to side width L, preferably less than 70 percent of side to side width L, and most preferably less than 30 percent of side to side width L. Side electrode terminal conductive portion side to side width 322 may be zero, may be less than 5 percent of side to side width L, may be less than 15 percent of side to side width L, may be less than 40 percent of side to side width L, and preferably is interconnected to conductive portions of side electrode terminal 305 in a region between the front and back electrodes 306, 310.

Structure 300 is shown as generally three dimensionally rectangular. Alternatively, structure 300 may have arcuate major surfaces with curvature either from side to side or front to back.

Structure 300 may be curved to the extent as to form a coiled generally cylindrical structure wherein one of side electrode terminals 301, 305 is at the center of the cylinder and aligned with the cylindrical axis and the other one of side electrode terminals is at the periphery of the cylinder and aligned with the cylindrical axis. In this alternative, front and back electrodes 306, 310, are at ends of the cylinder and offset from the center and periphery of the cylinder.

Structure 300 may be curved and modified to the extent as to form a coiled generally cylindrical structure wherein side electrode terminals 301, 305 are at opposite ends of the cylinder, one of front and back electrodes 306, 310 is at the center of the cylinder, and the other one of front and back electrodes has a surface portion forming part of the cylindrical surface of structure 300 at a middle of structure 300. In this alternative, the one of the front and back electrodes 306, 310 at the center of the cylinder is modified to include a conductive path extending along the axis of the cylinder to one end of the cylinder, and the side electrode terminal 306, 310 at that end of the cylinder is modified such that there is an insulating region surrounding portion of the conductive path connected to the centrally located terminal that extends to the end of the cylinder.

Alternatively, structure 300 may contain a series of folds in a zig zag configuration with fold axis along either the side to side or front to back direction.

Preferably, the ground or source or sink of charge connected to a shielding electrode of any embodiment of the invention has a surface area of at least 1, 2, 3, 4, 5, 6, 7, 8, 9, 10, 50, or 100 times the surface area of any plate of the shielding electrode.

Alternatively, structure 300 may include a set of front electrode terminals, similar in shape and dimension to front electrode terminal 306, but distributed along front surface 326 (and portions in the top and bottom surfaces) and/or a set of back electrode terminals distributed along back surface 327 (and portions in the top and bottom surfaces). Alternatively, front electrode terminal 306 or any one of multiple front and back electrodes may not include portions on one or both of the top and bottom surfaces of structure 300. Multiple front or back electrode embodiments preferably also have electrical connected to each front or back electrode at least one plate.

Multiple front electrode embodiments may have a different set of plates electrically connected to each electrode of the front plate. Similarly, multiple back electrode embodiments may have a different set of plates electrically connected to each electrode of the back plate. Sets of different electrode plates connected to multiple front and back electrodes would provide a structure with more than two non-shielding electrodes. Such a structure having multiple terminals can be incorporated in a circuit architecture having multiple loads or multiple sources wherein each pair of paths between a load and its source electrically contacts a terminal of the structure. Thus, one, two, three, or more sources and/or one, two, three, or more loads may be connected across a structure of the invention.

Multiple front electrode embodiments may have located in at least one plate multiple plates each either electrically connected to the same electrode or to different electrodes. In these embodiments, preferably the multiple plates in the same plane are plates of the electrodes other than the shielding electrode.

FIG. 4b shows in structure 400b portions of electrode plates that electrically contact to the electrode edge interconnection structure and/or electrode terminal shown in FIG. 3. FIGS. 5–8 show aspects of structure 400b.

Alternatively, as previously indicated, structures of the invention may include multiple plates in each electrode. At least one or each plate of each of the first and second electrodes an similar additional non-shielding electrodes may have a plurality of edges that form part of a front or back surface 326, 327. The necked portions of the type formed by lower first electrode plate front edge 820 and transitions 850, 860, may form right angles, or they may be very gradual having relatively large radii of curvatures extending from the edge 820 all the way to the corner edge recessed transitions 890a–d. In one alternative embodiment transitions 850, 860 and corner edge recessed transitions 890a–d merge to forma substantially circular major surface shaped plate, with our without a substantial necked portion resulting in edge 820.

The recesses of the type shown by front edge recess distance 870 from the front or back edges 326, 327 may have a length ranging from substantially zero to about 40 percent of front to back width W, preferably at least 1 percent, more preferably at least 4 percent, and preferably at least 10 percent of front to back width W.

Distance 630 may be less than, equal to, or greater than the length of front edge recess distance 870. Distance 630 may be zero, may be at least one, more preferably at least 2, 5, 10, or 20 times plate separation distance 630. Preferably, non-shielding electrode plates are recessed relative to adjacent shielding electrode plates along their entire periphery, except for the necked regions where they connect to electrode interconnection structure.

The setback distance of the shielding electrode plates, like lower shielding electrode front edge distance 771, from front and back surfaces 326, 327, is preferably less than the recess distance 870 of non-shielding electrode plates. Distance 771 along the front side surface in a region overlapping a neck of a non-shielding electrode plate such as edge 820 of plate 402b shown in FIG. 8, must be sufficient to prevent electrical connection of the shielding electrode plate to the non-shielding electrode's plate. Typically, distance 771 in such a region is at least one micron, preferably at least 5 microns, and may be 10, 20, 30, 40, 50, or more microns.

FIG. 7 shows a rectangular shielding plate electrode major surface for plate 401b. Alternatively, the width between front 326 and back 327 may vary. This width may be flared such that the width between the front 326 and the back 327 is large at sides 324, 325. The width of plate 401b at sides 324, 325 may equal the width from front to back of plate surrounding material 710. Plate 401b may be shaped to form in an inverse neck wherein the major surface of plate 401b has width W at all portions except a portion adjacent necked regions of the non-shielding electrodes like necked region 820, 850, 860 shown in FIG. 8.

FIGS. 8 and 9 shows lower and upper non-shielding electrode terminals as mirror images about line 910 in FIG. 9. Alternatively, each of these plates may include a set of more than one necked regions for making a plurality of electrical contacts to edge interconnection structure. Moreover, the necked regions may exist at different locations along the side to side length between sides 325, 325. Moreover, necks may have different neck widths (i.e., like the width between 850, 860) or edge widths (i.e., like the length of edge 82) from one another on the same plate or on different plates. Further, the setback distance 870 may be different between different necks on the same plate or on different plates. For example, in embodiments including more than two non-shielding electrode terminals, plates of one non-shielding electrode may all have the same neck width and different setback distance as one another, and either of both of those distance may be different from at least one other or all other plates of any other non-shielding electrode in the structure.

Structure 402b is shown with equal distances between plates and represent plates as energy pathways. However, each plate of the non-shielding electrodes and shielding electrode may have a different thickness form one another, and the distances between the top two and bottom two plates may be different from distances between the center three plates.

FIG. 15 shows a multilayer structure 1500 of the invention with equally spaced layers, and equally spaced recesses of layers from surfaces (such as the surface on the right hand side of the structure) and relative to the edges of the shielding layers. Alternatively, the distance of the recesses of each layer from a surface, the length of the recess of edges of plates of the non-shielding electrodes from the edges of plates of the shielding electrode, and the distances between adjacent plates may all be different from one another. In some embodiments, distances between several layers adjacent either or both of the top or the bottom are spaced further apart from one another than layers further from the top or bottom of the structure. Manufacturing requirements on a specified thickness of a specified number of layers may require adjusting thicknesses of the final layers to be either thicker or thinner than initial layers in order to meed the specified thickness. Manufacturing processing, such as heating, may result in layers all of initially the same nominal thickness having different thicknesses towards one or both of the top or bottom of the structure.

Structures like multilayer structure 1500 may have the same features and variations to their plates and overall shape as noted above for structure 402*b*.

FIG. 16*a* shows one section view of structure 1600. Alternatively, in the same section, there may be only one of conductive wire lines 1610, 1611, or 2, 3, 4, 5, or more conductive wire lines connecting plates of the same non-shielding electrode to one another. Alternatively, of course, structure 1600 may include a larger number of plates, such as the 11 shielding plates and 5 plates in each non-shielding electrode as in structure 1500, or more layers, such as 50, 100, 150, 200, or more. In structure with more layers, each wire line may not electrically connect to each plate of the same non-shielding electrode, and there may be 2, 3, 4, 5, 10, 20, 50, or more conductive wire lines electrically connecting to plates of the same non-shielding electrode. Further, the variations in shapes of the plates and the limitations on their relative setbacks and recesses discussed for structures 402*b* and 1500 are applicable to structures like structure 1600. Setback distances and relative distances discussed for edges of plates of non-shielding electrodes of structure 402*b* relative to edge interconnection structure correspond to the distance, in the plane of a plate, from edges of plates of non-shielding electrodes of structure 1500 to shielding plate-wire intersections 1630*b*.

Structures of the invention may be formed by laying down suitable precursor layers for dielectric and conductive material and subsequent heating, by thin film deposition, masking, and lithography techniques, by machining techniques including micro machining. Many such techniques are well known in the art.

Circuits may be constructed by the foregoing techniques, and also by soldering and mechanically and/or electrically connecting components to one another and to supporting structure.

In one circuit embodiment, a ground (or source or sink of charge), such as ground (or source or sink of charge) 60 in FIG. 2 is electrically connected to the shielding electrode interconnection structure at both sides 324, 325. Such connections were made in the circuit in which Device A and Device B were tested by mechanical connection of the ground (or source or sink of charge) 60 to each side corresponding to sides 324, 325 of structure 300 for devices A and B.

The foregoing disclosure is illustrative of certain embodiments of the invention. However, the inventor intends the scope of protection based upon the following claims and obvious equivalents thereof.

We claim:

1. A structure comprising:
   a first electrode;
   a second electrode;
   a shielding electrode;
   wherein at least one plate of said shielding electrode separates each plate of said first electrode from any plate of said second electrode;
   at least two plates of said shielding electrode sandwich between them all plates of said first electrode and said second electrode; and
   wherein said first electrode includes a first electrode plate having a first electrode plate major surface and at least one first electrode plate energy entry region, said second electrode includes a second electrode plate having at least one second electrode plate energy entry region;
   an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region;
   said energy pathway line segment having an energy pathway line segment length;
   a maximal energy perpendicular line segment corresponding to said energy pathway line segment, said maximal energy perpendicular line segment having a maximal energy perpendicular line segment length;
   wherein said maximal energy perpendicular line segment length is greater than said energy pathway line segment length.

2. The structure of claim 1 providing an insertion loss at ten megahertz across said first electrode and said second electrode of at least 80 dB.

3. The structure of claim 1 wherein length of each energy perpendicular line segment is greater than said energy pathway line segment length.

4. The structure of claim 1 wherein said first electrode plate has only one first electrode plate energy entry region.

5. The structure of claim 1 wherein said first electrode plate has a plurality of first electrode plate energy entry regions.

6. The structure of claim 1 wherein said at least one first electrode plate comprises a first electrode plate necked region that defines an energy entry region of said first electrode plate.

7. The structure of claim 1 wherein said at least one first electrode plate intersects at least one wire line at an energy entry region intersection, said at least one wire line extends substantially perpendicular to said first electrode plate major surface, and said energy entry region intersection defines an energy entry region of said first electrode plate.

8. The structure of claim 7 wherein said first electrode comprises a plurality of first electrode plates and said at least one wire line intersects each one of said plurality of first electrode plates.

9. The structure of claim 7 wherein said energy entry region intersection does not contact a peripheral edge of said first electrode plate.

10. The structure of claim 1 wherein said first electrode comprises a first electrode plate having a thickness less than 50 microns.

11. The structure of claim 1 wherein said first electrode comprises a first electrode plate having a thickness greater than a few tens of angstroms.

12. The structure of claim 1 wherein said at least one first electrode plate comprises a first electrode plate necked region that defines at least part of an energy entry region of said first electrode.

13. The structure of claim 1 wherein said at least one first electrode plate is generally rectangular and has a first electrode plate longer side and two first electrode plate shorter sides adjacent said first electrode plate longer side.

14. The structure of claim 13 wherein said at least one first electrode plate has a first electrode plate region forming at least part of an energy entry region of said first electrode, and said first electrode plate region is closer to said first electrode plate longer side than to either of said two first electrode plate shorter sides.

15. The structure of claim 13 wherein said first electrode plate longer side has a first electrode plate longer side length, and said at least one first electrode plate includes a first electrode plate region forming at least part of an energy entry region of said first electrode, and said first electrode plate region that extends along said first electrode plate longer side for a length of at least one twentieth of said first electrode plate longer side length.

16. The structure of claim 13 wherein said first electrode plate longer side has a first electrode plate longer side length, said at least one first electrode plate includes a first electrode plate region forming at least part of an energy entry region of said first electrode, and said first electrode plate regions extends along said first electrode plate longer side for a length of less than said first electrode plate longer side length.

17. The structure of claim 13 wherein said first electrode plate longer side has a first electrode plate longer side length, said at least one first electrode plate includes a first electrode plate region that forms at least part of an energy entry region of said first electrode, and said first electrode plate region extends along said first electrode plate longer side for a length of no more than two thirds said first electrode plate longer side length.

18. The structure of claim 13 wherein said at least one first electrode plate includes a first electrode plate region that forms at least part of an energy entry region of said first electrode, and said longer side has a longer side center and two longer side ends, and said first electrode plate region is closer to said longer side center than to either of said two longer side ends.

19. The structure of claim 1 wherein said structure forms a discrete component.

20. The structure of claim 1 wherein said structure forms part of an interposer or first level interconnect to an integrated circuit.

21. The structure of claim 1 wherein said structure forms part of an integrated circuit.

22. The structure of claim 1 wherein a ratio of said maximal energy perpendicular line segment length to said energy pathway line segment length is greater than 1.2.

23. The structure of claim 1 wherein ratios of lengths of all energy perpendicular line segments to said energy pathway line segment length are all greater than 1.5.

24. The structure of claim 1 wherein a ratio of said energy perpendicular line segment length to said energy pathway line segment length is greater than 2.

25. The structure of claim 1 wherein a ratio of said energy perpendicular line segment length to said energy pathway line segment length is less than 100.

26. The structure of claim 1 wherein said first electrode plate major surface has a generally rectangular shape.

27. The structure of claim 1 wherein said first electrode plate major surface has a generally oval shape.

28. The structure of claim 1 wherein said first electrode plate major surface has a neck that protrudes from the rest of said first electrode plate in a direction parallel to said energy pathway line segment.

29. The structure of claim 28 further comprising a first edge interconnection structure and wherein said neck forms an edge protrusion connection to said first edge interconnection structure.

30. The structure of claim 1 wherein said first electrode comprises a plurality of first electrode plates and said plurality of first electrode plates are connected to one another by conductive material extending perpendicular to said first electrode plate major surface.

31. The structure of claim 1 wherein said shielding electrode comprises a plurality of shielding electrode plates and said plurality of shielding electrode plates are connected to one another by conductive material extending perpendicular to said first electrode plate major surface.

32. The structure of claim 1 wherein said shielding electrode further comprises at least one end cap or terminal.

33. The structure of claim 32 wherein said at least two plates of said shielding electrode that sandwich between them all plates of said first electrode and said second electrode and said at least one end cap or terminal substantially enclose said first electrode and said second electrode.

34. The structure of claim 32 wherein said at least one end cap or terminal of said shielding electrode comprises at least a first shielding electrode end cap or terminal and a second shielding electrode end cap or terminal, and electrically conductive material extends exterior to said first electrode and said second electrode to connect said first shielding electrode end cap or terminal to said second shielding electrode end cap or terminal.

35. The structure of claim 1 further comprising an electrically conductive element exterior to said first electrode and said second electrode which is electrically connected to said shielding electrode and which has a surface area of at least the area defined by a plate of said shielding electrode.

36. A combination including the structure of claim 1 and a conductive surface adjacent said structure and functioning as a shield layer for said structure.

37. A combination including the structure of claim 1 and a first level interconnect, said first level interconnect having a conductive area, said conductive area functioning as a shielding plate of said shielding electrode.

38. A circuit comprising a structure of claim 1, in which said structure is configured to function as a voltage divider.

39. A structure comprising:
a first electrode;
a second electrode;
a shielding electrode;
wherein at least one plate of said shielding electrode separates each plate of said first electrode from any plate of said second electrode;
wherein at least two plates of said shielding electrode sandwich between them all plates of said first electrode and said second electrode;
wherein said first electrode includes a first electrode plate and edge interconnection structure; and
wherein a length of said first electrode plate along a direction of an energy pathway line segment of said first electrode plate is equal to or less than a length of said first electrode plate in a direction non-parallel to said energy pathway line segment and non-perpendicular to a plane defined by a major surface of said first electrode plate.

40. A structure comprising:
a first electrode;
a second electrode;
a shielding electrode;
wherein at least one plate of said shielding electrode separates each plate of said first electrode from any plate of said second electrode;
wherein at least two plates of said shielding electrode sandwich between them all plates of said first electrode and said second electrode;
wherein said first electrode includes a first electrode plate and a first electrode terminal;
wherein said second electrode includes a second electrode plate and a second electrode terminal; and
wherein a length of a first line segment extending from said first electrode terminal to said second electrode terminal in a plane defined by said first electrode plate is equal to or shorter than a length of a second line segment extending rom said first electrode plate in a direction in said plane and non-parallel to said first line segment.

41. A structure comprising:
a first electrode;
a second electrode;
a shielding electrode;
wherein at least one plate of said shielding electrode separates each plate of said first electrode from any plate of said second electrode;
at least two plates of said shielding electrode sandwich between them all plates of said first electrode and said second electrode; and
a first edge electrode interconnection structure electrically connecting plates of said first electrode to one another;
a second edge electrode interconnection structure electrically connecting plates of said second electrode to one another;
wherein said first electrode includes a first electrode plate having a first electrode plate major surface and at least one first electrode plate energy entry region including a first contact region in contact with said first edge electrode interconnection structure;
wherein said second electrode includes a second electrode plate having a second electrode plate major surface and at least one second electrode plate energy entry region including a second contact region in contact with said second edge electrode interconnection structure;
an energy pathway line segment is defined by a line segment terminating in regions defined by a projection onto a plane parallel to a plane defined by said first electrode plate major surface of (1) said first contact region and (2) said second contact region;
said energy pathway line segment having an energy pathway line segment length;
a maximal energy perpendicular line segment corresponding to said energy pathway line segment, said maximal energy perpendicular line segment having a maximal energy perpendicular line segment length;
wherein said maximal energy perpendicular line segment length is greater than said energy pathway line segment length.

42. The structure of claim 41 providing an insertion loss at ten megahertz across said first electrode and said second electrode of at least 80 dB.

43. The structure of claim 41 wherein length of each energy perpendicular line segment is greater than said energy pathway line segment length.

44. The structure of claim 41 wherein first electrode plate has only one first electrode plate energy entry region.

45. A method of making a structure comprising:
forming a first electrode;
forming a second electrode;
forming a shielding electrode;
wherein at least one plate of said shielding electrode separates each plate of said first electrode from any plate of said second electrode;
at least two plates of said shielding electrode sandwich between them all plates of said first electrode and said second electrode; and
wherein said first electrode includes a first electrode plate having a first electrode plate major surface and at least one first electrode plate energy entry region, said second electrode includes a second electrode plate having at least one second electrode plate energy entry region;
an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region;
said energy pathway line segment having an energy pathway line segment length;
a maximal energy perpendicular line segment corresponding to said energy pathway line segment, said maximal energy perpendicular line segment having a maximal energy perpendicular line segment length;
wherein said maximal energy perpendicular line segment length is greater than said energy pathway line segment length;
wherein said forming steps include depositing, layer by layer, material for plates of said first electrode, said second electrode, and said shielding electrode to form a deposited structure.

46. The method of claim 45 further comprises depositing between layers of said first electrode, said second electrode, and said shielding electrode, at least one of insulating material and precursor for insulating material.

47. The method of claim 45 further comprising the step of firing said structure.

48. The method of claim 45 wherein said depositing includes depositing material in a vacuum.

49. The method of claim 48 wherein said depositing includes depositing material from a vapor.

50. The method of claim 45 further comprising depositing a resist, exposing a pattern in said resist, and removing resist corresponding to said pattern.

51. The method of claim 50 further comprising at least one of depositing after removing said resist corresponding to said pattern and etching corresponding to said pattern.

52. The method of claim 45 further comprising folding said deposited structure to form a folded structure.

53. The method of claim 45 further comprising rolling said deposited structure to form a generally cylindrically shaped rolled structure.

54. A method of using a structure, said structure comprising:
a first electrode;
a second electrode;
a shielding electrode;
wherein at least one plate of said shielding electrode separates each plate of said first electrode from any plate of said second electrode;
at least two plates of said shielding electrode sandwich between them all plates of said first electrode and said second electrode; and
wherein said first electrode includes a first electrode plate having a first electrode plate major surface and at least one first electrode plate energy entry region, said second electrode includes a second electrode plate having at least one second electrode plate energy entry region;
an energy pathway line segment is defined by a line segment terminating in regions defined by a projection onto a plane parallel to a plane defined by said first electrode plate major surface of (1) said at least one first electrode plate energy entry region and (2) said at least one second electrode plate energy entry region;
said energy pathway line segment having an energy pathway line segment length;
a maximal energy perpendicular line segment corresponding to said energy pathway line segment, said maximal energy perpendicular line segment having a maximal energy perpendicular line segment length;

wherein said maximal energy perpendicular line segment length is greater than said energy pathway line segment length;

said method comprising:

electrically connecting said first electrode and said second electrode across a source and a load;

applying power from said source to said load.

55. The method of claim 54 further comprising:

connecting said shielding electrode to a relatively large metallic structure which is not electrically connected to either said first electrode or said second electrode.

56. The method of claim 55 wherein said relatively large metallic structure is a chassis ground.

57. The method of claim 55 wherein said relatively large metallic structure is an earth ground.

58. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a generally rectangular plate having a longer side and two shorter sides, and an energy entry region of said first electrode is closer to a longer side of said generally rectangular plate than to either of said two shorter sides.

59. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a generally rectangular plate, said generally rectangular plate having a longer side and a shorter side, and said longer side is longer than said shorter side, said longer side having a longer side first end, a longer side second end, and a longer side center; and wherein an energy entry region of said first electrode is closer to said longer side center than to either one of said longer side first end and longer side second end.

60. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a generally rectangular plate having a longer side and a shorter side, and said longer sides is longer than said shorter side; and wherein an energy entry region of said first electrode extends along said longer side.

61. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a plate having a longer side and a shorter side, said longer side is longer than said shorter side, and said longer side has a longer side length;

wherein there are a plurality of the energy entry regions for the first electrode, and the interval between at least two of said plurality of energy entry regions extends in a direction defined by the general extension of said longer side, and said interval extends for less than about ⅔ of said longer side length.

62. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a first electrode plate and edge interconnection structure;

wherein a length of said first electrode plate along a direction of an energy pathway line segment of said first electrode plate is equal to or less than a length of said first electrode plate in a direction perpendicular to said energy pathway line segment and parallel to a plane defined by a major surface of said first electrode plate.

63. A structure comprising:

a first electrode;

a second electrode;

a shielding electrode;

wherein at least one plate of said shielding electrode separates each plate of said first electrode from any plate of said second electrode;

wherein at least two plates of said shielding electrode sandwich between them all plates of said first electrode and said second electrode; and wherein said first electrode includes a first electrode plate and a first electrode edge interconnection structure;

wherein said second electrode includes a second electrode plate and a second electrode edge interconnection structure;

wherein a length along a perpendicular line segment extending from said first electrode edge interconnection structure to said second electrode edge interconnection structure in a plane defined by said first electrode plate is equal to or shorter than a length of said first electrode plate in a direction in said plane and perpendicular to said perpendicular line segment.

64. A structure comprising:
a first electrode;
a second electrode;
a shielding electrode;
wherein at least one plate of said shielding electrode separates each plate of said first electrode from any plate of said second electrode;
at least two plates of said shielding electrode sandwich between them all plates of said first electrode and said second electrode; and
wherein said first electrode includes a plate having a longer side and a shorter side, and an energy entry region of said first electrode is closer to said longer side of said than to said shorter side.

65. A method of making a structure comprising:
providing a first electrode;
providing a second electrode;
providing a shielding electrode;
wherein at least one plate of said shielding electrode separates each plate of said first electrode from any plate of said second electrode;
at least two plates of said shielding electrode sandwich between them all plates of said first electrode and said second electrode; and
wherein said first electrode includes a plate having a longer side and a shorter side, and an energy entry region of said first electrode is closer to said longer side of said than to said shorter side.

66. A method of using the structure of claim 65, comprising:
connecting said first electrode and said second electrode in a circuit; and
applying power to said circuit.

* * * * *